US012681567B2

(12) United States Patent
Chandrasekhar et al.

(10) Patent No.: US 12,681,567 B2
(45) Date of Patent: Jul. 14, 2026

(54) SYSTEMS AND METHODS FOR TRACKING A CONTROLLER

(71) Applicant: QUALCOMM Incorporated, San Diego, CA (US)

(72) Inventors: Ramesh Chandrasekhar, Encinitas, CA (US); Md Sazzadur Rahman, San Jose, CA (US); Martin Renschler, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/909,647

(22) Filed: Oct. 8, 2024

(65) Prior Publication Data

US 2025/0028386 A1     Jan. 23, 2025

Related U.S. Application Data

(63) Continuation of application No. 18/342,649, filed on Jun. 27, 2023, now Pat. No. 12,141,341, which is a
(Continued)

(51) Int. Cl.
*G02B 27/01* (2006.01)
*A61B 8/00* (2006.01)
(Continued)

(52) U.S. Cl.
CPC .............. *G06F 3/012* (2013.01); *G06F 3/011* (2013.01); *G06F 3/014* (2013.01); *G06F 3/017* (2013.01);
(Continued)

(58) Field of Classification Search
None
See application file for complete search history.

(56) References Cited

U.S. PATENT DOCUMENTS

| | | | |
|---|---|---|---|
| 5,856,844 A | 1/1999 | Batterman et al. | |
| 9,459,692 B1 | 10/2016 | Li | |

(Continued)

FOREIGN PATENT DOCUMENTS

| | | |
|---|---|---|
| CN | 102193631 A | 9/2011 |
| CN | 104011788 A | 8/2014 |

(Continued)

OTHER PUBLICATIONS

He C., et al., "An Inertial and Optical Sensor Fusion Approach for Six Degree-of-Freedom Pose Estimation" doi: 10.3390/s150716448, vol. 15, No. 7, Sensors 2015, pp. 16448-16465.
(Continued)

*Primary Examiner* — Carl Adams
(74) *Attorney, Agent, or Firm* — QUALCOMM Incorporated

(57)     ABSTRACT

A method by a wearable device is described. The method includes receiving geometric information from a controller. The geometric information includes a point cloud and a key frame of the controller. The method also includes receiving first six degree of freedom (6DoF) pose information from the controller. The method further includes synchronizing a coordinate system of the wearable device with a coordinate system of the controller based on the point cloud and the key frame of the controller. The method additionally includes rendering content in an application based on the first 6DoF pose information.

30 Claims, 12 Drawing Sheets

Related U.S. Application Data continuation of application No. 15/417,608, filed on Jan. 27, 2017, now Pat. No. 11,740,690.

(51) Int. Cl.

| | |
|---|---|
| *G06F 3/01* | (2006.01) |
| *G06F 3/0346* | (2013.01) |
| *G06T 7/246* | (2017.01) |
| *G06T 7/292* | (2017.01) |
| *G06T 7/73* | (2017.01) |
| *G06T 19/00* | (2011.01) |

(52) U.S. Cl.

CPC ............ *G06F 3/0346* (2013.01); *G06T 7/246* (2017.01); *G06T 7/292* (2017.01); *G06T 7/73* (2017.01); *G06T 2207/10028* (2013.01)

(56) References Cited

U.S. PATENT DOCUMENTS

| | | | |
|---|---|---|---|
| 9,501,725 | B2 | 11/2016 | Vrcelj et al. |
| 11,740,690 | B2 | 8/2023 | Chandrasekhar et al. |
| 2011/0221657 | A1 | 9/2011 | Haddick et al. |
| 2013/0225305 | A1 | 8/2013 | Yang et al. |
| 2015/0070274 | A1 | 3/2015 | Morozov |
| 2015/0142248 | A1 | 5/2015 | Han et al. |
| 2016/0026253 | A1 | 1/2016 | Bradski et al. |
| 2016/0357261 | A1 | 12/2016 | Bristol et al. |
| 2016/0364013 | A1 | 12/2016 | Katz et al. |
| 2017/0262045 | A1* | 9/2017 | Rouvinez ................ G06F 3/011 |
| 2018/0091866 | A1 | 3/2018 | Sun et al. |
| 2018/0136744 | A1 | 5/2018 | Karlsson et al. |
| 2018/0217663 | A1 | 8/2018 | Chandrasekhar et al. |
| 2022/0375170 | A1* | 11/2022 | Osokin ................... G06F 30/12 |
| 2023/0341930 | A1 | 10/2023 | Chandrasekhar |

FOREIGN PATENT DOCUMENTS

| | | |
|---|---|---|
| CN | 104238738 A | 12/2014 |
| CN | 104699247 A | 6/2015 |
| CN | 105378596 A | 3/2016 |
| WO | 2014201176 A1 | 12/2014 |
| WO | 2018005069 A1 | 1/2018 |

OTHER PUBLICATIONS

International Preliminary Report on Patentability—PCT/US2017/063240, The International Bureau of WIPO—Geneva, Switzerland, Nov. 9, 2018.

International Search Report and Written Opinion—PCT/US2017/063240—ISA/EPO—Mar. 9, 2018.

\* cited by examiner

Figure 1:
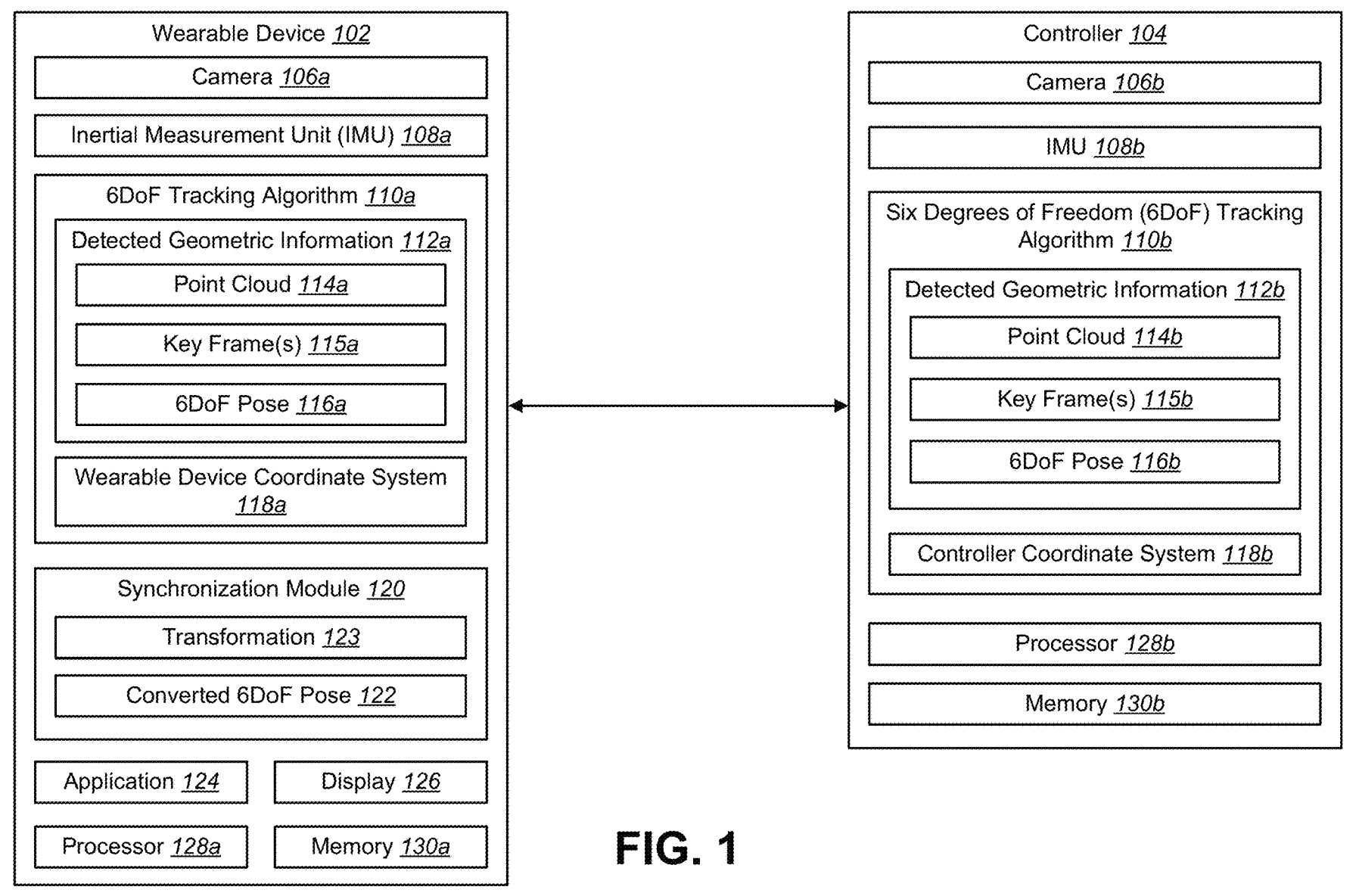

Controller 104

Camera 106b

IMU 108b

Six Degrees of Freedom (6DoF) Tracking Algorithm 110b

Detected Geometric Information 112b

Point Cloud 114b

Key Frame(s) 115b

6DoF Pose 116b

Controller Coordinate System 118b

Processor 128b

Memory 130b

Wearable Device 102

Camera 106a

Inertial Measurement Unit (IMU) 108a

6DoF Tracking Algorithm 110a

Detected Geometric Information 112a

Point Cloud 114a

Key Frame(s) 115a

6DoF Pose 116a

Wearable Device Coordinate System 118a

Synchronization Module 120

Transformation 123

Converted 6DoF Pose 122

Application 124

Display 126

Processor 128a

Memory 130a

Figure 2:
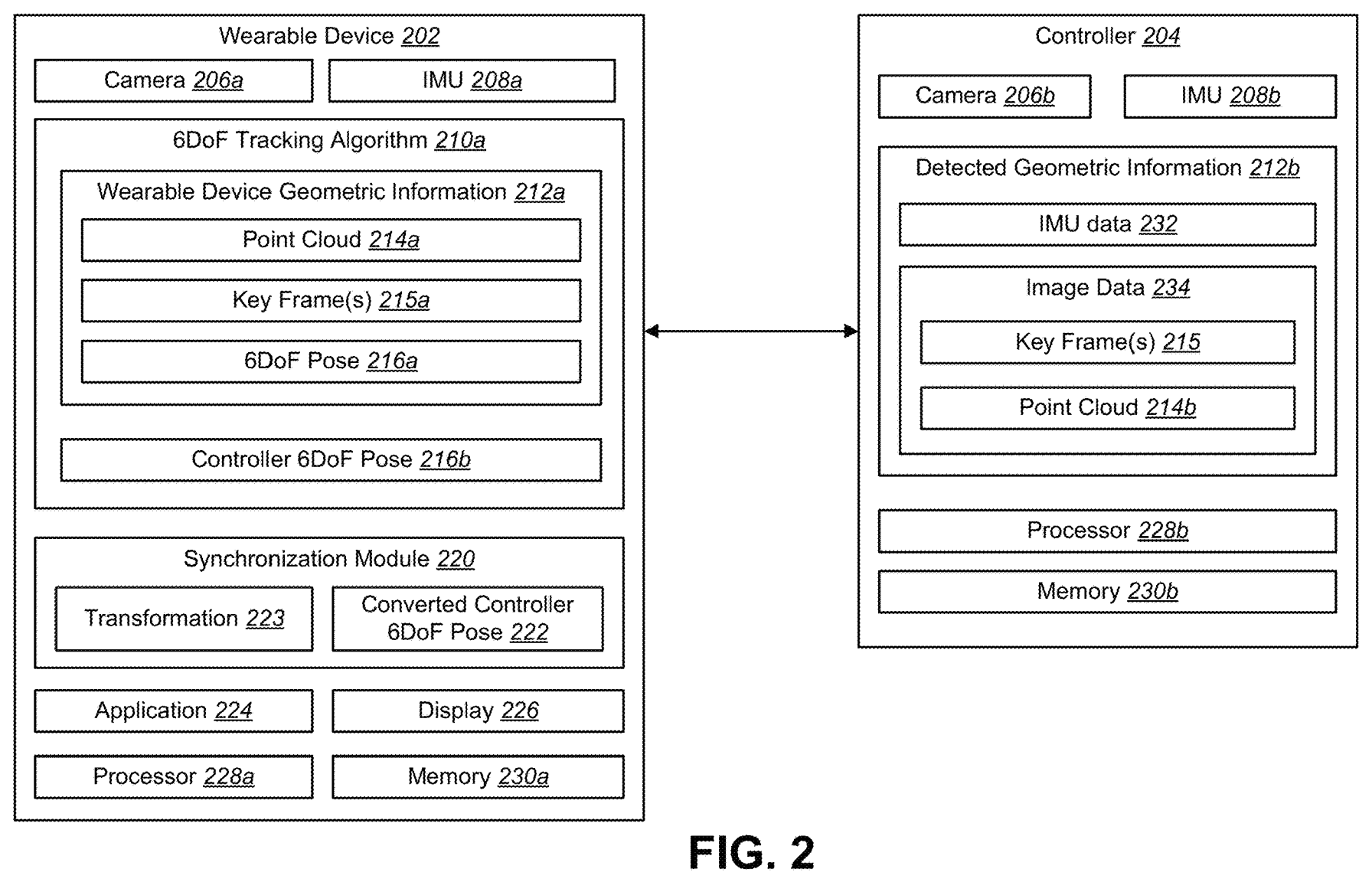

Controller 204

Camera 206b

IMU 208b

Detected Geometric Information 212b

IMU data 232

Image Data 234

Key Frame(s) 215

Point Cloud 214b

Processor 228b

Memory 230b

Wearable Device 202

Camera 206a

IMU 208a

6DoF Tracking Algorithm 210a

Wearable Device Geometric Information 212a

Point Cloud 214a

Key Frame(s) 215a

6DoF Pose 216a

Controller 6DoF Pose 216b

Synchronization Module 220

Transformation 223

Converted Controller 6DoF Pose 222

Application 224

Display 226

Processor 228a

Memory 230a

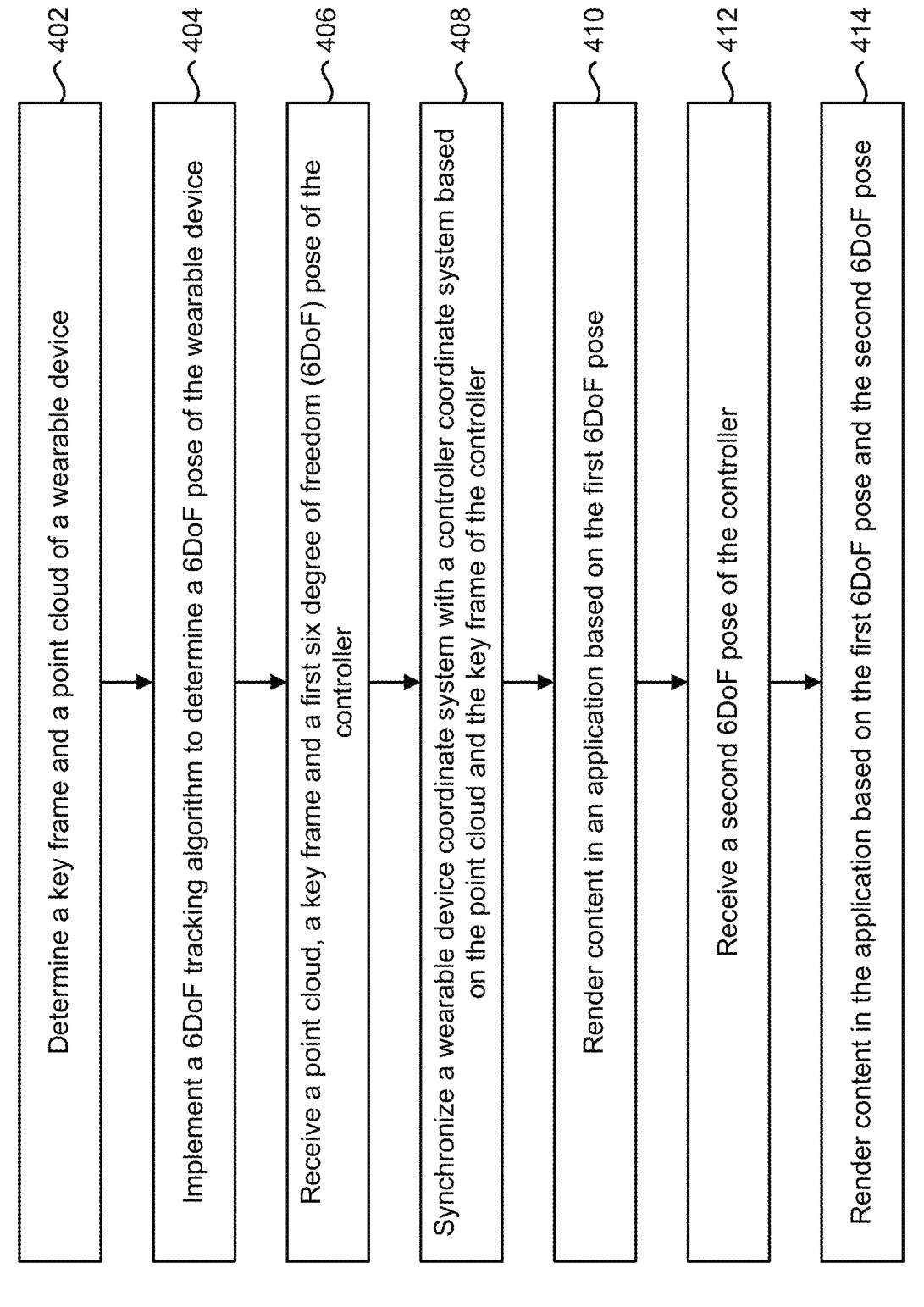

402 Determine a key frame and a point cloud of a wearable device

404 Implement a 6DoF tracking algorithm to determine a 6DoF pose of the wearable device 406 Receive a point cloud, a key frame and a first six degree of freedom (6DoF) pose of the controller 408 Synchronize a wearable device coordinate system with a controller coordinate system based on the point cloud and the key frame of the controller 410 Render content in an application based on the first 6DoF pose 412 Receive a second 6DoF pose of the controller 414 Render content in the application based on the first 6DoF pose and the second 6DoF pose

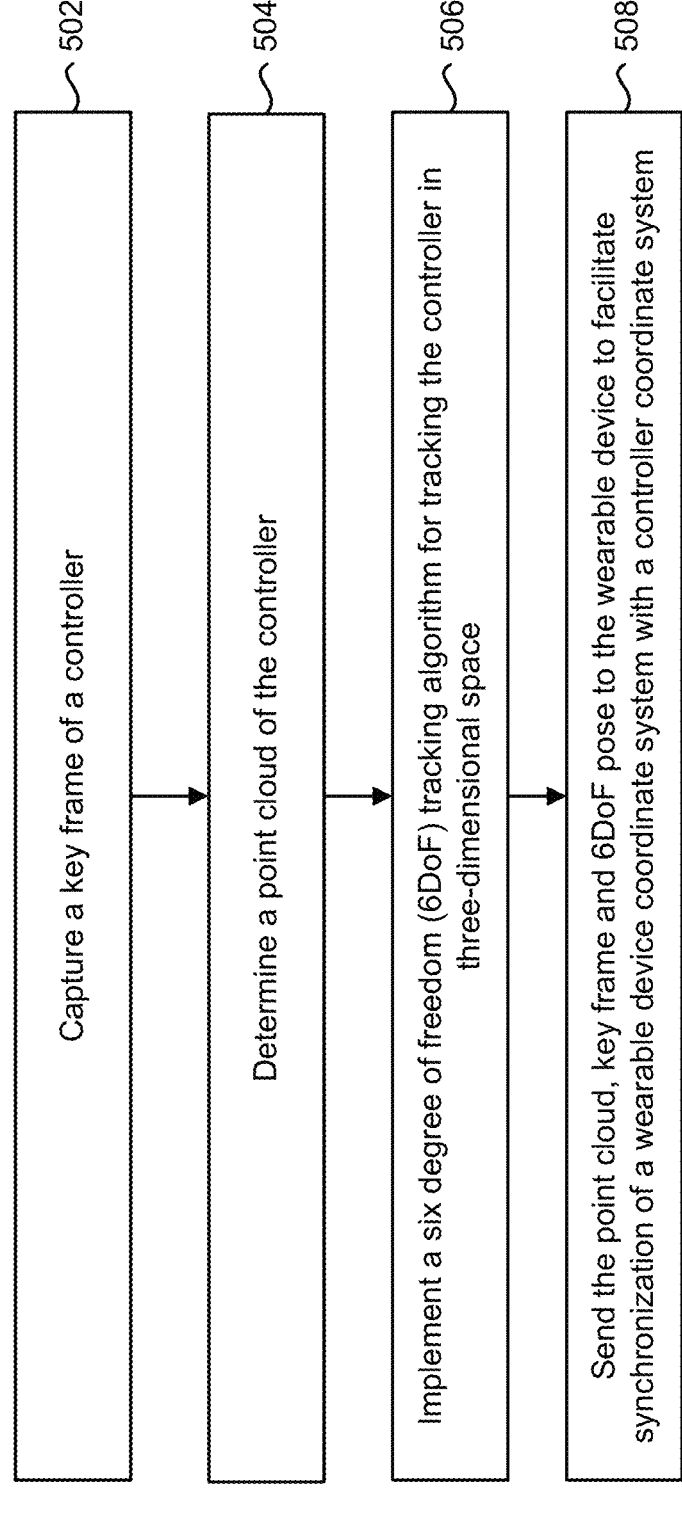

500

502 — Capture a key frame of a controller

504 — Determine a point cloud of the controller

506 — Implement a six degree of freedom (6DoF) tracking algorithm for tracking the controller in three-dimensional space 508 — Send the point cloud, key frame and 6DoF pose to the wearable device to facilitate synchronization of a wearable device coordinate system with a controller coordinate system

Implement a six degree of freedom (6DoF) tracking algorithm to determine a point cloud, key frame and a first 6DoF pose of a controller

604

Send the point cloud, key frame and the first 6DoF pose to the wearable device

606

Implement the 6DoF tracking algorithm to determine a second 6DoF pose of the controller

608

Send the second 6DoF pose to the wearable device

600

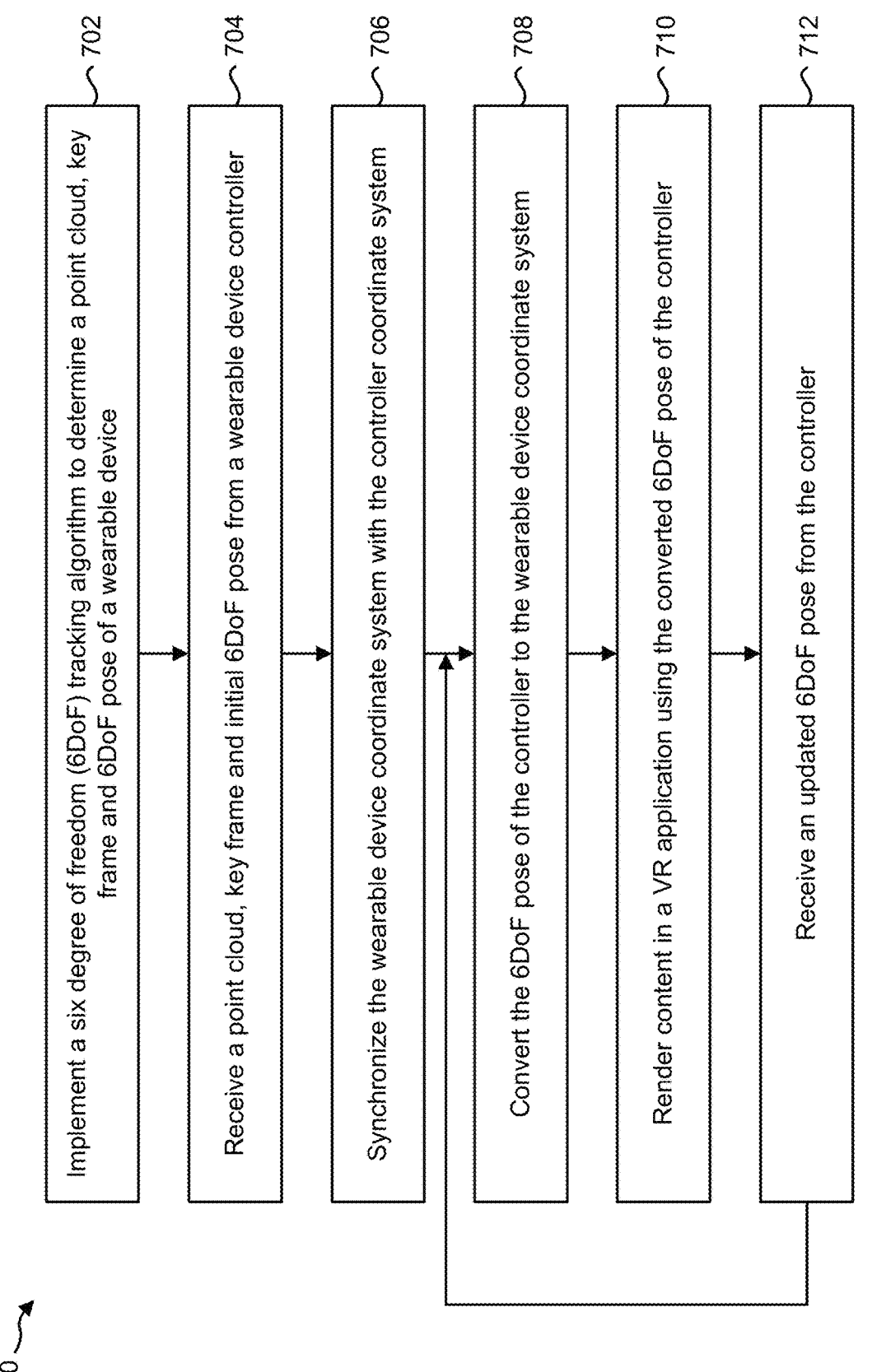

Implement a six degree of freedom (6DoF) tracking algorithm to determine a point cloud, key frame and 6DoF pose of a wearable device — 702

Receive a point cloud, key frame and initial 6DoF pose from a wearable device controller — 704

Synchronize the wearable device coordinate system with the controller coordinate system — 706

Convert the 6DoF pose of the controller to the wearable device coordinate system — 708

Render content in a VR application using the converted 6DoF pose of the controller — 710

Receive an updated 6DoF pose from the controller — 712

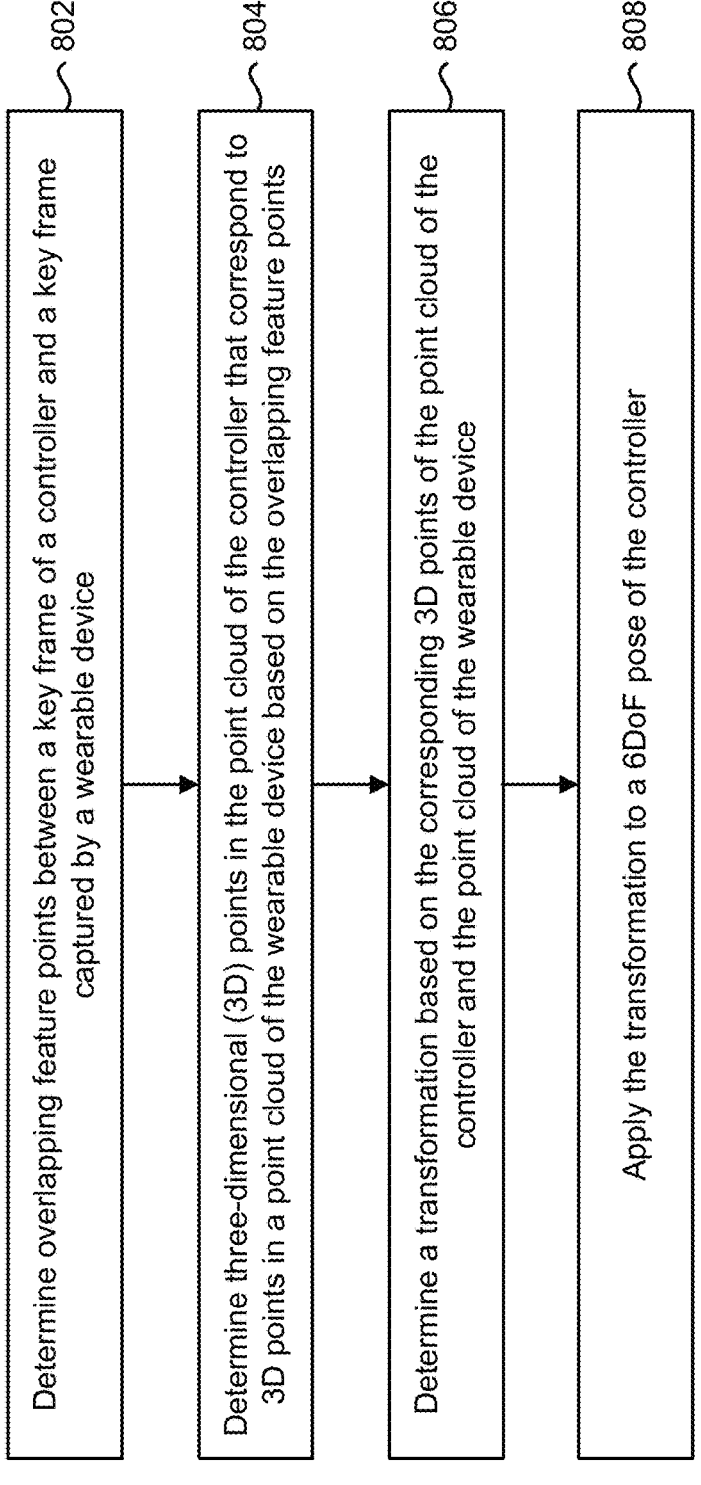

Determine overlapping feature points between a key frame of a controller and a key frame captured by a wearable device ⌐802

Determine three-dimensional (3D) points in the point cloud of the controller that correspond to 3D points in a point cloud of the wearable device based on the overlapping feature points ⌐804

Determine a transformation based on the corresponding 3D points of the point cloud of the controller and the point cloud of the wearable device ⌐806

Apply the transformation to a 6DoF pose of the controller ⌐808

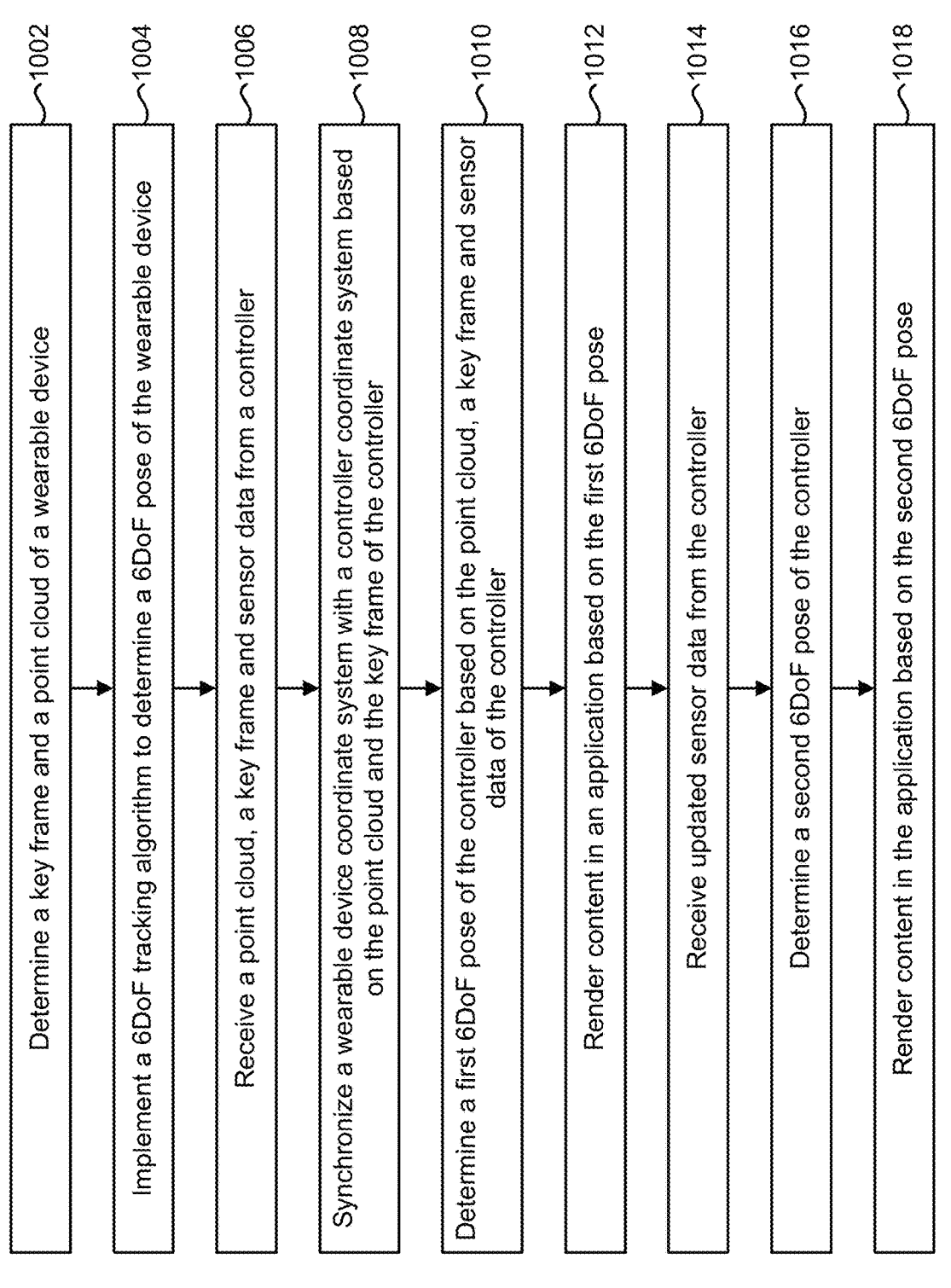

1002 Determine a key frame and a point cloud of a wearable device

1004 Implement a 6DoF tracking algorithm to determine a 6DoF pose of the wearable device 1006 Receive a point cloud, a key frame and sensor data from a controller 1008 Synchronize a wearable device coordinate system with a controller coordinate system based on the point cloud and the key frame of the controller 1010 Determine a first 6DoF pose of the controller based on the point cloud, a key frame and sensor data of the controller 1012 Render content in an application based on the first 6DoF pose 1014 Receive updated sensor data from the controller 1016 Determine a second 6DoF pose of the controller 1018 Render content in the application based on the second 6DoF pose

SYSTEMS AND METHODS FOR TRACKING A CONTROLLER

CROSS-REFERENCE TO RELATED APPLICATIONS

This application is a continuation of U.S. Non-Provisional application Ser. No. 18/342,649, filed Jun. 27, 2023, which is a continuation of U.S. Non-Provisional application Ser. No. 15/417,608, filed Jan. 27, 2017, both of which are hereby incorporated by reference, in their entirety and for all purposes.

TECHNICAL FIELD

The present disclosure relates generally to communications. More specifically, the present disclosure relates to systems and methods for tracking a controller.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

In some cases it may be beneficial to track the position and orientation of a controller of a wearable device. For example, a wearable device may render and display content for a virtual reality (VR) or augmented reality (AR) application. Six degree of freedom (6DoF) tracking of the controller is desirable but challenging. As can be observed from this discussion, systems and methods that improve 6DoF tracking of a controller in three-dimensional space may be beneficial.

SUMMARY

A method by a wearable device is described. The method includes receiving geometric information from a controller. The geometric information includes a point cloud and a key frame of the controller. The method also includes receiving first six degree of freedom (6DoF) pose information from the controller. The method further includes synchronizing a coordinate system of the wearable device with a coordinate system of the controller based on the point cloud and the key frame of the controller. The method additionally includes rendering content in an application based on the first 6DoF pose information.

The first 6DoF pose information may include a first 6DoF pose determined by a 6DoF tracking algorithm implemented on the controller. The first 6DoF pose information may include image data and inertial measurement unit (IMU) data from which a 6DoF tracking algorithm implemented on the wearable device determines the first 6DoF pose of the controller. Determining the first 6DoF pose of the controller by the 6DoF tracking algorithm implemented on the wearable device may include determining a three-dimensional orientation of the controller within the point cloud of the controller based on timestamped IMU data and timestamped image data received from the controller.

The method may also include receiving, from the controller, a second 6DoF pose of the controller determined by the 6DoF tracking algorithm implemented on the controller or updated image data and updated IMU data from which the 6DoF tracking algorithm implemented on the wearable device determines the second 6DoF pose. The method may further include rendering content in the application based on the second 6DoF pose.

Synchronizing the coordinate system of the wearable device with the coordinate system of the controller may include determining overlapping feature points between the key frame of the controller and a key frame captured by the wearable device. Three-dimensional (3D) points in the point cloud of the controller may be determined that correspond to 3D points in a point cloud of the wearable device based on the overlapping feature points. A transformation may be determined based on the corresponding 3D points of the point cloud of the controller and the point cloud of the wearable device. The transformation may be applied to the first 6DoF pose.

The method may also include receiving a periodic point cloud update and key frame update from the controller. The coordinate system of the wearable device may be synchronized with the coordinate system of the controller based on the point cloud update and the key frame update.

The method may also include implementing a 6DoF tracking algorithm on the wearable device to determine a 6DoF pose of the wearable device. Rendering content in the application may also be based on the 6DoF pose of the wearable device. The method may further include determining a point cloud and a key frame of the wearable device based on image data received from the wearable device.

A wearable device is also described. The wearable device includes a memory and a processor in communication with the memory. The processor is configured to receive geometric information from a controller, the geometric information including a point cloud and a key frame of the controller. The processor is also configured to receive first 6DoF pose information from the controller. The processor is further configured to synchronize a coordinate system of the wearable device with a coordinate system of the controller based on the point cloud and the key frame of the controller. The processor is additionally configured to render content in an application based on the first 6DoF pose information.

A computer-program product is also described. The computer-program product includes a non-transitory computer-readable medium having instructions thereon. The instructions include code for causing a wearable device to receive geometric information from a controller, the geometric information including a point cloud and a key frame of the controller. The instructions also include code for causing the wearable device to receive first 6DoF pose information from the controller. The instructions further include code for causing the wearable device to synchronize a coordinate system of the wearable device with a coordinate system of the controller based on the point cloud and the key frame of the controller. The instructions additionally include code for causing the wearable device to render content in an application based on the first 6DoF pose information.

A wearable device is also described. The wearable device includes means for receiving geometric information from a controller, the geometric information including a point cloud and a key frame of the controller. The wearable device also includes means for receiving first 6DoF pose information from the controller. The wearable device further includes means for synchronizing a coordinate system of the wearable device with a coordinate system of the controller based on the point cloud and the key frame of the controller. The wearable device additionally includes means for rendering content in an application based on the first 6DoF pose information.

BRIEF DESCRIPTION OF THE DRAWINGS

FIG. 1 is a block diagram illustrating a configuration of a wearable device and a controller configured for six degree of freedom (6DoF) tracking in three-dimensional space;

FIG. 2 is a block diagram illustrating another configuration of wearable device and a controller configured for 6DoF tracking in three-dimensional space;

FIG. 4 is a flow diagram illustrating a configuration of a method for tracking a controller as implemented by a wearable device;

FIG. 5 is a flow diagram illustrating a configuration of a method for tracking a controller as implemented by the controller;

FIG. 7 is a flow diagram illustrating another configuration of a method for tracking a controller as implemented by a wearable device;

FIG. 8 is a flow diagram illustrating a configuration of a method for synchronizing the coordinate system of a wearable device with the coordinate system of the controller;

FIG. 10 is a flow diagram illustrating a configuration of a method for tracking a controller as implemented by a wearable device;

DETAILED DESCRIPTION

Figure 3:
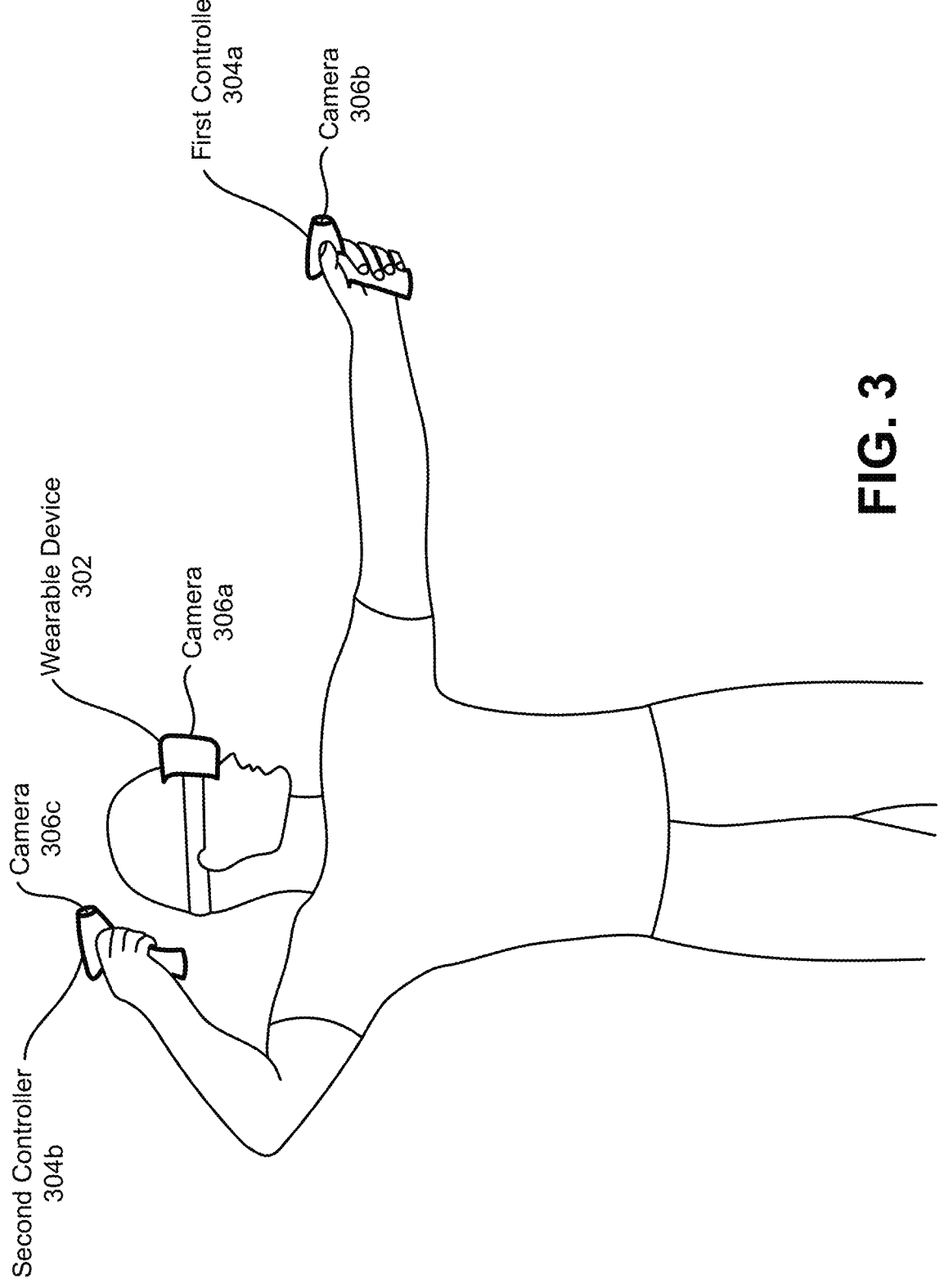
FIG. 3 illustrates an example of a user with a wearable device, a first controller and a second controller.

Various configurations are described with reference to the Figures, where like reference numbers may indicate functionally similar elements. The systems and methods as generally described and illustrated in the Figures could be arranged and designed in a wide variety of different configurations. Thus, the following more detailed description of several configurations, as represented in the Figures, is not intended to limit scope, but is merely representative.

FIG. 1 is a block diagram illustrating a configuration of a wearable device 102 and a controller 104 that are configured for six degree of freedom (6DoF) tracking in three-dimensional space. The wearable device 102 and the controller 104 are electronic devices. The wearable device 102 and the controller 104 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices include laptop or desktop computers, cellular phones, smart phones, wireless modems, e-readers, tablet devices, gaming systems, robots, aircraft, unmanned aerial vehicles (UAVs), automobiles, etc. Some of these devices may operate in accordance with one or more industry standards.

Examples of the wearable device 102 include a virtual reality (VR) headset, an augmented reality (AR) headset, a head mounted display, or other wearable or movable display device (e.g., sleeve or watch).

The wearable device 102 may be configured with a processor 128a and a memory 130a. The processor 128a may execute an application 124 and a 6DoF tracking algorithm 110a. In an implementation, the processor 128a may be an application digital signal processor (ADSP). Examples of the application 124 include a VR application or AR application. These include VR and AR games, flight simulators, vehicle guidance systems (for controlling UAVs, for instance), robotic surgical equipment interfaces, etc.

In an implementation, the wearable device 102 may include a display 126. For example, in the case of a VR or AR headset, the wearable device may include a display 126 that is mounted just in front of a user's eyes. The wearable device 102 may project visual images on the display 126. In another implementation, the wearable device 102 may not include a display 126. For example, the wearable device 102 may be connected to an external display 126 (e.g., monitor).

The wearable device 102 may include hardware and software for sensing its position in a three-dimensional environment. The wearable device 102 may include a camera 106a. The camera 106a may include an image sensor and an optical system (e.g., lenses) that focuses images of objects that are located within the field of view of the optical system onto the image sensor. The camera 106a may be configured to capture digital images. Although the present systems and methods are described in terms of captured images, the techniques discussed herein may be used on any digital image. Therefore, the terms video frame and digital image may be used interchangeably herein. Likewise, in certain implementations the wearable device 102 may not include a camera 106a and optical system, but may receive or utilize stored digital images.

The wearable device 102 may also include an inertial measurement unit (IMU) 108a. An IMU 108 is a system that measures linear and angular motion. In an implementation, the IMU 108 may include one or more gyroscopes and one or more accelerometers. The IMU 108a may generate inertial information about the wearable device 102. For example, the IMU 108a may output the angular velocity and acceleration of the wearable device 102.

The term "degrees of freedom" (DoF) refers to the movement of an object in space. There are six DoFs in total, divided into two different types. One type of movement is translation movement. An object is able to translate in three DoFs: forward/backward, up/down, and left/right. The other type of movement is rotation movement. An object is able to rotate with three DoFs: pitch, yaw, and roll. Any possible movement of an object can be expressed as a combination of the basic six DoFs, referred to as 6DoF herein.

The camera 106a and the IMU 108a may provide data to a 6DoF tracking algorithm 110a. The wearable device 102 may implement the 6DoF tracking algorithm 110a to determine geometric information 112a associated with the position and orientation of the wearable device 102. Using the image data from the camera 106a and the inertial data provided by the IMU 108a, the 6DoF tracking algorithm 110a may detect geometric information 112a. The detected geometric information 112a may be used to track the movement of the wearable device 102.

In an implementation, the detected geometric information 112a may include a point cloud 114a, one or more key frames 115a and a 6DoF pose 116a of the wearable device 102. The point cloud 114a may be determined from the image data provided by the camera 106a. The point cloud 114a may include depth information for points within the environment of the wearable device 102, as observed by the camera 106a. Alternatively, the point cloud 114a may be generated by a 3D scanner (not shown). For example, the wearable device 102 may include a laser (e.g., LIDAR) scanner that generates a depth map of a scene.

In an implementation, the point cloud 114a may be obtained using a sensor fusion tracking algorithm. The input of such sensor fusion algorithms are IMU data and camera frames. Camera frames may determine feature points of the environment that can be tracked. The 3D location of those feature points may be determined using triangulation from the IMU data and camera frame data. This set of 3D points constructs the point cloud 114a.

The image data may include key frames 115a that are used by the 6DoF tracking algorithm 110a to generate a wearable device coordinate system 118a. The point cloud 114a may be a set of data points in the wearable device coordinate system 118a. The data points in the point cloud 114a correspond to objects in the environment of the wearable device 102.

The 6DoF tracking algorithm 110a may also determine the 6DoF pose 116a of the wearable device 102. For example, the 6DoF tracking algorithm 110a may use the inertial data provided by the IMU 108a and/or visual information provided by the camera 106a to determine the orientation of the wearable device 102 in space. The 6DoF tracking algorithm 110a may synchronize the 6DoF pose 116a to the wearable device coordinate system 118a.

In an implementation, a 6DoF pose 116a may be obtained using a sensor fusion tracking algorithm. The sensor fusion tracking algorithm keeps track of the available points in the point cloud 114a. The 3D location of a set of points from a spatial frame and current body frame may be used to compute the 6DoF pose 116a of the current body frame from the spatial frame.

The wearable device 102 may use the detected geometric information 112a to render content in the application 124. For example, the detected geometric information 112a may be used to simulate the user's view in the virtual reality environment.

In many scenarios, it is desirable to track the movement of a controller 104 that is associated with the wearable device 102. The controller 104 may be separately movable in space from the wearable device 102. Two example use cases for tracking controller 104 movement are (i) controlling hand movement in a VR or AR game, and (ii) painting in 3D space with VR. For example, if a user is playing a VR game, the user may be moving in a VR world. While moving, the user may want to touch some object (either real or virtual) with their hands. If the user is playing games like ping-pong or moving their hand with a virtual sword, this movement needs to be tracked.

One approach to 6DoF tracking involves the use of multiple external cameras for tracking. These external cameras are separate from the controller 104. In this approach, the external cameras may be mounted at fixed locations in a room. The external cameras may observe and track the movement of a controller 104 in this space. However, because this approach uses fixed external cameras, this is not a mobile solution and is not cost effective (e.g., requiring additional cameras for additional environments).

Another approach involves the use of a depth camera on a wearable device 102 for tracking the user's hand. However, this approach has high latency due to the wearable device 102 having to perform all of the 3D tracking. This approach also has limited scope, because the user's hand must always be in the camera's field of view. For example, if a user's hand is behind their back, the camera cannot track this movement.

The systems and methods described herein provide for 6DoF tracking of a controller 104 in three-dimensional (3D) space. In a first approach, the controller 104 may perform 6DoF tracking itself. In this approach, the controller 104 may determine its 6DoF pose 116b and provide the 6DoF pose 116b to the wearable device 102. In a second approach, the wearable device 102 may determine the 6DoF pose 116b of the controller 104 based on sensor data provided by the controller 104. This sensor data may include image data and IMU data. This second approach is described in connection with FIG. 2.

The controller 104 may be a game controller (e.g., VR game controller or AR game controller). In another implementation, the controller 104 may be used for non-game applications 124. The controller 104 may be configured as a handheld controller. In another implementation, the controller 104 may be configured to be affixed to another part of a user's body (e.g., arm, leg, torso, etc.).

The controller 104 may be configured with a camera 106b and an IMU 108b. In this first approach, the controller 104 may also be configured with a 6DoF tracking algorithm 110b. The camera 106b, IMU 108b and 6DoF tracking algorithm 110b of the controller 104 may be implemented as described in connection with the wearable device 102. The controller 104 may be configured with a processor 128b and memory 130b to execute the 6DoF tracking algorithm 110b. In an implementation, the processor 128b may be an application digital signal processor (ADSP).

In an implementation, the controller 104 may implement the 6DoF tracking algorithm 110b to determine geometric information 112b associated with the position and orientation of the controller 104. Therefore, the controller 104 may have a local implementation of the 6DoF tracking algorithm 110b.

In this implementation, the wearable device 102 and the controller 104 may have the same set of capabilities of camera 106 and IMU 108 and may run the same 6DoF tracking algorithm 110. This may simplify the physical design of the wearable device 102 and controller 104 and unify the types of information that is processed by the 6DoF tracking algorithms 110. However, this does not preclude the use of different types of hardware and data to track the wearable device 102 and the controller 104.

In this implementation, the geometric information 112b detected by the controller 104 may include a point cloud 114b, one or more key frames 115b and a 6DoF pose 116b of the controller 104, which may be determined as described above. The 6DoF tracking algorithm 110b may determine a controller coordinate system 118b based on the point cloud 114b. The 6DoF tracking algorithm 110b may use the inertial data provided by the IMU 108b and/or visual information provided by the camera 106b to determine the orientation of the controller 104 in space. The 6DoF tracking algorithm 110b may synchronize the 6DoF pose 116b to the controller coordinate system 118b.

It should be noted that the controller coordinate system 118b is not the same as the wearable device coordinate system 118a. In other words, the wearable device 102 and the controller 104 do not determine an absolute world coordinate system of the environment. The controller 104 may not have knowledge about absolute position in world coordinates. The controller 104 has an absolute position in its own controller coordinate system 118b.

Therefore, the wearable device 102 and the controller 104 have knowledge of their position in their relative coordinate systems 118. The controller 104 is not getting tracking information from another source (e.g., external camera, lighthouse or other tracking device) that has knowledge of position relative to the absolute position of the room. Rather, the controller 104 is autonomously determining its position and orientation.

In an implementation, the controller 104 may determine its controller coordinate system 118b in an initialization procedure. This may occur during boot up of the controller 104. This initialization procedure may also occur at different times during operation of the controller 104. For example, if the wearable device 102 and controller 104 enter a new environment, the wearable device 102 and the controller 104 may perform the initialization procedure to determine their respective coordinate systems 118.

The controller 104 may send the detected geometric information 112b to the wearable device 102 to facilitate synchronization of the wearable device coordinate system 118a with a controller coordinate system 118b. In an implementation, the controller 104 may be configured to wirelessly send the detected geometric information 112b to the wearable device 102. For example, communication between the controller 104 and the wearable device 102 may occur in accordance with any suitable wireless communication protocol (e.g., WiFi, Bluetooth). In another implementation, communication between the controller 104 and the wearable device 102 may occur in accordance with any suitable wired communication protocol.

As described above, the coordinate systems 118 as determined locally by the wearable device 102 and controller 104 are different. The wearable device 102 may include a synchronization module 120 that synchronizes the wearable device coordinate system 118a with the controller coordinate system 118b. The synchronization module 120 may determine a transformation 123 from the controller coordinate system 118b to the wearable device coordinate system 118a using the detected geometric information 112b received from the controller 104. The coordinate systems 118 of the wearable device 102 and the controller 104 may be synchronized with one another by exploiting the fact that they share the same environment.

It should be noted that the wearable device 102 may correlate the two 6DoF positions (i.e., the 6DoF pose 116a of the wearable device 102 and the 6DoF pose 116b of the controller 104) if there is a reference that allows the wearable device 102 to bring the two coordinate systems 118 together. For example, during the initialization procedure (e.g., during boot up) the wearable device 102 and the controller 104 should observe part of the room at the same time to provide a reference to bring the two coordinate systems 118 together.

The wearable device 102 may use the point cloud 114b received from the controller 104 to synchronize the wearable device coordinate system 118a with the controller coordinate system 118b. When the controller 104 performs the initialization procedure, it senses its point cloud 114b and key frames 115b. The wearable device 102 also has its own set of point cloud 114a and key frames 115a. Because the wearable device 102 and the controller 104 are moving through the same environment, their key frames 115a, 115b will have an overlapping set of feature points. Based on this set of overlapping feature points, the synchronization module 120 may determine a transformation 123 from the controller coordinate system 118b to the wearable device coordinate system 118a. Therefore, at least a portion of the key frame 115b sent from the controller 104 should overlap with at least a portion of a key frame 115a determined by the wearable device 102.

In an implementation, the transformation 123 may be obtained by first using an image matching algorithm to determine overlapping feature points between the wearable device key frame 115a and the controller key frame 115b. Once such overlapping feature points are determined, their corresponding 3D points may be extracted from the wearable device point cloud 114a as well as the controller point cloud 114b. For the same real-world points (i.e., feature points), 3D information (e.g., x, y and z coordinates) of those points may be obtained from wearable device 102 and controller 104. A transformation matrix may be found using this 3D point correspondence. If the transformation matrix is represented with a 3×4 matrix, at least 4 overlapping feature points are required.

The synchronization module 120 may then convert the 6DoF pose 116b from the controller coordinate system 118b to the wearable device coordinate system 118a. For example, the synchronization module 120 may determine a converted 6DoF pose 122 of the controller 104 by applying the transformation 123 to the received 6DoF pose 116b. The wearable device 102 may then determine the difference between the converted 6DoF pose 122 of the controller 104 and the 6DoF pose 116a of the wearable device 102.

The wearable device 102 may use the converted 6DoF pose 122 for rendering content in the application 124. For example, once the synchronization module 120 computes the converted 6DoF pose 122 of the controller 104, the wearable device 102 may use that converted 6DoF pose 122 for rendering an object (e.g., hand, sword, etc.) in the application 124 that corresponds to the position of controller 104.

The controller 104 may periodically (e.g., at a frequency of 60 Hz) send its computed 6DoF pose 116b to the wearable device 102. The synchronization module 120 may convert this updated 6DoF pose 116b from the controller coordinate system 118b to the wearable device coordinate system 118a. For example, the synchronization module 120 may apply the transformation 123 to the updated 6DoF pose 116b. The wearable device 102 may then determine the difference between the converted 6DoF pose 122 of the controller 104 and the 6DoF pose 116a of the wearable device 102. Using this difference, the wearable device 102 may update rendering the content of the application 124.

In an implementation, the wearable device 102 and the controller 104 may periodically update their point clouds 114 to limit drift of the synchronized coordinate systems 118. The controller 104 may periodically send a point cloud 114b update and key frame 115b update to the wearable device 102. Upon receiving the updated point cloud 114b and key frame 115b, the wearable device 102 may synchronize the coordinate system 118a of the wearable device 102 with the coordinate system 118b of the controller 104 based on the point cloud 114b update and the key frame 115b update. This may be accomplished as described above.

In an implementation, the wearable device 102 may use the point cloud 114b provided by the controller 104 to supplement its own point cloud 114a. As described above, the point clouds 114 may have a portion that overlap. However, some of the point cloud 114b provided by the controller 104 may not be observed by the wearable device 102. Therefore, the wearable device 102 may add this information to its own point cloud 114a to extend its field of view. In other words, the camera 106b of the controller 104 may act as a remote camera for the wearable device 102.

In yet another implementation, the wearable device 102 may be configured to track the 6DoF motion of a plurality of controllers 104. For example, a user may hold a controller 104 in each hand. In this implementation, each of the controllers 104 may include a camera 106b, and an IMU 108b. Furthermore, each of the controllers 104 may independently implement a 6DoF tracking algorithm 110b to detect their respective geometric information 112b. The wearable device 102 may receive the detected geometric information 112b from each of the plurality of controllers 104.

The wearable device 102 may convert the different coordinate systems 118b of the different controllers 104 to its own wearable device coordinate system 118a. The wearable device 102 may then use the converted 6DoF pose 122 for each of the controllers 104 for rendering content in an application 124. For example, the wearable device 102 may display multiple objects (e.g., hands) in the application 124 corresponding to the positions of the plurality of controllers 104.

In another implementation, the wearable device 102 may be configured to send its detected geometric information 112a back to the controller 104. The controller 104 may implement operations based on the detected geometric information 112a received from the wearable device 102. For example, the controller 104 may implement haptic feedback or emit a sound based on the detected geometric information 112a received from the wearable device 102.

The described systems and methods offer a mobile, flexible and non-tethered 6DoF controller 104. In the case of VR and AR, the described solution is better than existing solutions because it allows an unrestricted and untethered VR or AR 6DoF gaming experience. External cameras are not required, and the user is not confined to a specific area. The described solution allows unconstrained controller 104 movements with lower latency. For example, the user is able to move their hands freely. The described solution also reduces time-to-market by reusing the 6DoF tracking algorithm 110a of the wearable device 102 in the controller 104.

FIG. 2 is a block diagram illustrating another configuration of a wearable device 202 and a controller 204 configured for 6DoF tracking in three-dimensional space. In particular, this configuration illustrates a second approach to 6DoF tracking in which the wearable device 202 determines the 6DoF pose 216b of the controller 204 based on image 234 data and IMU data 232 provided by the controller 204.

The wearable device 202 may be implemented in accordance with the wearable device 102 described in connection with FIG. 1. For example, the wearable device 202 may include a camera 206a that captures image data and an IMU 208a that measures inertial data (e.g., linear and angular motion). The wearable device 202 may be configured with a processor 228a and a memory 230a. The processor 228a may execute an application 224 and a 6DoF tracking algorithm 210a. In an implementation, the wearable device 202 may also include a display 226.

The wearable device 202 may implement the 6DoF tracking algorithm 210a to determine geometric information 212a associated with the position and orientation of the wearable device 202. Using the image data from the camera 206a and the inertial data provided by the IMU 208a, the 6DoF tracking algorithm 210a may detect a point cloud 214a, one or more key frames 215a and a 6DoF pose 216a of the wearable device 202. The point cloud 214a and the 6DoF pose 216a may be determined as described in connection with FIG. 1.

The controller 204 may also be configured with a camera 206b and an IMU 208b. In this second approach, the controller 204 may send geometric information 212b from which the 6DoF tracking algorithm 210a implemented on the wearable device 202 determines the controller 6DoF pose 216b. For example, the controller 204 may capture image data 234 using its camera 206b. The image data 234 may include one or more key frames 215 and a point cloud 214b, which may be determined as described in connection with FIG. 1. The geometric information 212b may also include IMU data 232 as measured by the IMU 208b. The controller 204 may be configured with a processor 228b and memory 230b to execute one or more operations to capture the IMU data 232 and image data 234.

The controller 204 may send the detected geometric information 212b to the wearable device 202. The controller 204 may also send IMU data 232 and image data 234 from which the 6DoF tracking algorithm 210a implemented on the wearable device 202 determines the 6DoF pose 216b of the controller 204. The controller 204 may send timestamped image data 234 and timestamped IMU data 232 to facilitate synchronization of the controller 6DoF pose 216b with the 6DoF pose 216a of the wearable device 202.

Upon receiving the IMU data 232 and image data 234, the 6DoF tracking algorithm 210a may determine the controller 6DoF pose 216b. This may include determining a three-dimensional orientation of the controller 204 within the point cloud 214b of the controller 204 based on its image data 234 and IMU data 232. This may be accomplished as described in connection with FIG. 1.

The wearable device 202 may synchronize the coordinate system 118a of the wearable device 202 with the coordinate system 118b of the controller 204 based on the point cloud 214b and the key frame 215 of the controller 204. For example, a synchronization module 220 may determine overlapping feature points between the key frame 215 of the controller 204 and the key frame 215a captured by the wearable device 202. The synchronization module 220 may then determine 3D points in the point cloud 214b of the controller 204 that correspond to 3D points in the point cloud 214a of the wearable device 202 based on the overlapping feature points. The synchronization module 220 may determine a transformation 223 based on the corresponding 3D points of the point cloud 214b of the controller 204 and the point cloud 214a of the wearable device 202. The wearable device 202 may apply the transformation 223 to the controller 6DoF pose 216b to determine a converted controller 6DoF pose 222.

The wearable device 202 may use the converted 6DoF pose 222 for rendering content in an application 224. For example, once the synchronization module 220 computes the converted 6DoF pose 222 of the controller 204, the wearable device 202 may use that converted 6DoF pose 222 for rendering an object (e.g., hand, sword, etc.) in the application 224 that corresponds to the position of the controller 204.

The controller 204 may periodically send updated sensor data to the wearable device 202. The updated sensor data may include updated IMU data 232 and/or image data 234.

The wearable device 202 may use the updated sensor data to determine an updated controller 6DoF pose 216b. For example, the 6DoF tracking algorithm 210a implemented on the wearable device 202 may determine the updated controller 6DoF pose 216b as described in connection with FIG. 1. The synchronization module 220 may convert this updated 6DoF pose 216b from the controller coordinate system 118b to the wearable device coordinate system 118a.

For example, the synchronization module 220 may apply the transformation 223 to the updated 6DoF pose 216b.

The wearable device 202 may render content in the application 224 based on the first 6DoF pose 216b and the updated 6DoF pose 216b. For example, the wearable device 202 may determine the difference between the first 6DoF pose 216b and the updated 6DoF pose 216b. This difference may indicate the position and motion of the controller 204 relative to the 6DoF pose 216a of the wearable device 202. Using this difference, the wearable device 202 may update rendering the content of the application 224.

In another implementation, the wearable device 202 may be configured to track the 6DoF motion of a plurality of controllers 204. This may be accomplished as described in connection with FIG. 1. However, in this approach, the wearable device 202 may determine the 6DoF pose 216b for each of the plurality of controllers 204 based on the geometric information 212b provided by the controllers 204.

This approach may be beneficial when the wearable device 202 has more processing capability than the controller 204. Instead of implementing the 6DoF tracking on the controller 204, the wearable device 202 may receive image data 232 and sensor data from the controller 204. The wearable device 202 may then perform the 6DoF tracking for the controller 204 using this image data 232 and sensor data.

FIG. 3 illustrates an example of a user with a wearable device 302, a first controller 304a and a second controller 304b. The wearable device 302 and the controllers 304a-b may be implemented in accordance with the systems and methods described herein. For example, the wearable device 302 and the controllers 304a-b may be implemented according to FIGS. 1-2.

In this example, the wearable device 302 is positioned on a user's head. For example, the wearable device 302 may be a VR headset or an AR headset. The wearable device 302 may execute an application 124 in which content is rendered using the 6DoF pose 116b of the controllers 304.

The wearable device 302 may be configured to perform 6DoF tracking. For example, the wearable device 302 may be configured with a camera 306a that captures image data and an IMU 108a that measures inertial data of the wearable device 302. A 6DoF tracking algorithm 110a may determine the 6DoF pose 116a of the wearable device 302 based on the image data and the inertial data.

In this example, the user has a controller 304 in each hand. Each controller 304 may be configured with a camera 306 that captures image data. For example, a first controller 304a may include a camera 306b and the second controller 304b may also include a camera 306c. Each controller 304a-b may also include an IMU 108b that measures inertial data of its respective controller 304. While two controllers 304a-b are depicted in FIG. 3, it should be noted that a single controller 304 or more than two controllers 304 may be used.

In a first approach, each controller 304 may be configured with a 6DoF tracking algorithm 110b that determines the 6DoF pose 116b of the controller 304 based on the image data and the inertial data captured by the controller 304. This may be accomplished as described in connection with FIG. 1. In a second approach, the controllers 304 may be configured to send the image data and the inertial data captured by the controller 304 to the wearable device 302. The wearable device 302 then implements the 6DoF tracking algorithm 110b to determine the 6DoF pose 116b of the controllers 304. This may be accomplished as described in connection with FIG. 2. The wearable device 302 may then synchronize the coordinate systems 118 of the wearable device 302 and the controller 304 and render content in the application 124 based on the 6DoF pose 116b of the controllers 304.

A benefit of the systems and methods described herein includes performing 6DoF tracking of the controllers 304 without the use of external (e.g., wall-mounted) cameras that observe and track the movement of a controller 304 in a certain space. Because a controller 304 includes its own camera 306, the controller 304 is able to sense its environment without the use of external cameras. This allows the user to move through the environment without being restricted to the field of view of external cameras.

Another benefit of the systems and methods described herein includes 6DoF tracking of a controller 304 that is not within the field of view of the camera 306a of the wearable device 302. One approach to 6DoF tracking uses the camera 306a of the wearable device 302 to track an object (e.g., hand or controller 304). However, this approach only works when the tracked object is within the field of view of the wearable device 302 camera 306a. In this example, the first controller 304a is observable by the wearable device 302 camera 306a. The second controller 304b is behind the user's head and out of the field of view of the wearable device 302 camera 306a. Therefore, according to this approach, the 6DoF pose 116b of the second controller 304b cannot be tracked.

The systems and methods described herein, however, provide for 6DoF tracking of a controller 304 that is not within the field of view of the camera 306a of the wearable device 302 without the use of external cameras that observe the controller 304. For example, in the case of the second controller 304b, the 6DoF pose 116b of the second controller 304b may be determined based on the image data and IMU data captured by the second controller 304b.

FIG. 4 is a flow diagram illustrating a configuration of a method 400 for tracking a controller 104 as implemented by a wearable device 102. The wearable device 102 and the controller 104 may be implemented in accordance with FIG. 1. For example, the controller 104 may be configured with a camera 106b and an inertial measurement unit (IMU) 108b. The wearable device 102 may include a 6DoF tracking algorithm 110a. The controller 104 may also include a 6DoF tracking algorithm 110b.

The wearable device 102 may determine 402 a key frame 115a and a point cloud 114a of the wearable device 102. For example, a camera 106a of the wearable device 102 may capture image data. The wearable device 102 may select an image as a key frame 115a. The wearable device 102 may determine 402 the point cloud 114a using image data and IMU data, as described in connection with FIG. 1.

The wearable device 102 may implement 404 the 6DoF tracking algorithm 110a to determine a 6DoF pose 116a of the wearable device 102. For example, the wearable device 102 may implement 404 the 6DoF tracking algorithm 110a as part of an initialization procedure (e.g., when wearable device 102 boots up). The point cloud 114a and the 6DoF pose 116a of the wearable device 102 are in a wearable device coordinate system 118a.

The wearable device 102 may receive 406 a point cloud 114b, key frame 115b and a first 6DoF pose 116b from the controller 104. For example, the controller 104 may capture a key frame 115b using its camera 106b. The controller 104 may also implement a 6DoF tracking algorithm 110b to determine its point cloud 114b and the first 6DoF pose 116b.

The point cloud 114*b* and first 6DoF pose 116*b* received 406 from the controller 104 are in a controller coordinate system 118*b*.

The wearable device 102 may synchronize 408 the wearable device coordinate system 118*a* with the controller coordinate system 118*b* based on the point cloud 114*b* and the key frame 115*b* of the controller 104. This may be accomplished as described in connection with FIG. 1. For example, the wearable device 102 may determine a transformation 123 from the controller coordinate system 118*b* to the wearable device coordinate system 118*a* based on overlapping feature points in the point cloud 114*a* of the wearable device 102 and the point cloud 114*b* of the controller 104. The wearable device 102 may apply the transformation 123 to the first 6DoF pose 116*b* to determine a converted 6DoF pose 122 of the controller 104.

The wearable device 102 may render 410 content in an application 124 based on the first 6DoF pose 116*b* of the controller 104. For example, the wearable device 102 may use the converted 6DoF pose 122 for rendering an object in the application 124 that corresponds to the position of controller 104.

The wearable device 102 may receive 412 a second 6DoF pose 116*b* from the controller 104. For example, the controller 104 may periodically implement the 6DoF tracking algorithm 110*b* to determine the second (i.e., updated) 6DoF pose 116*b* of the controller 104. The controller 104 may then send the second 6DoF pose 116*b* to the wearable device 102. The wearable device 102 may convert the second 6DoF pose 116*b* to the wearable device coordinate system 118*a* using the transformation 123.

The wearable device 102 may render 414 content in the application 124 based on the first 6DoF pose 116*b* and the second 6DoF pose 116*b*. For example, the wearable device 102 may determine the difference between the first 6DoF pose 116*b* and the second 6DoF pose 116*b*. This difference may indicate the position and motion of the controller 104 relative to the 6DoF pose 116*a* of the wearable device 102. Using this difference, the wearable device 102 may render 414 updated content in the application 124.

FIG. 5 is a flow diagram illustrating a configuration of a method 500 for tracking a controller 104 as implemented by the controller 104. The controller 104 may be configured to communicate with a wearable device 102. The wearable device 102 and the controller 104 may be implemented in accordance with FIG. 1. The controller 104 may be configured with a camera 106*b* and an IMU 108*b*. The wearable device 102 may include a 6DoF tracking algorithm 110*a*. The controller 104 may also include a 6DoF tracking algorithm 110*b*.

The controller 104 may capture 502 a key frame 115*b*. For example, the controller 104 may capture a key frame 115*b* using its camera 106*b*.

The controller 104 may determine 504 a point cloud 114*b*. For example, the controller 104 may implement the 6DoF tracking algorithm 110*b* to determine its point cloud 114*b* using the image data captured by the camera 106*b* and the inertial data measured by the IMU 108*b*. This may be accomplished as described in connection with FIG. 1.

The controller 104 may implement 506 a 6DoF tracking algorithm 110*b* for tracking the controller 104 in three-dimensional space. For example, the 6DoF tracking algorithm 110*b* may determine the three-dimensional position and orientation (i.e., the 6DoF pose 116*b*) of the controller 104 using the point cloud 114*b*, image data and inertial data measured by the IMU 108*b*.

The controller 104 may send 508 the point cloud 114*b*, key frame 115*b* and 6DoF pose 116*b* to the wearable device 102 to facilitate synchronization of a wearable device coordinate system 118*a* with the controller coordinate system 118*b*. In an implementation, the controller 104 may initially send 508 the point cloud 114*b*, key frame 115*b* and its 6DoF pose 116*b* to the wearable device 102 for synchronizing during an initialization procedure (e.g., when controller 104 boots up).

To synchronize the two coordinate systems 118, at least a portion of the key frame 115*b* sent from the controller 104 should overlap with at least a portion of a key frame 115*a* determined by the wearable device 102. In other words, the cameras 106 of the controller 104 and the wearable device 102 should both see at least part of the same environment at the same time to bring the two coordinate systems 118 together.

Figure 6:
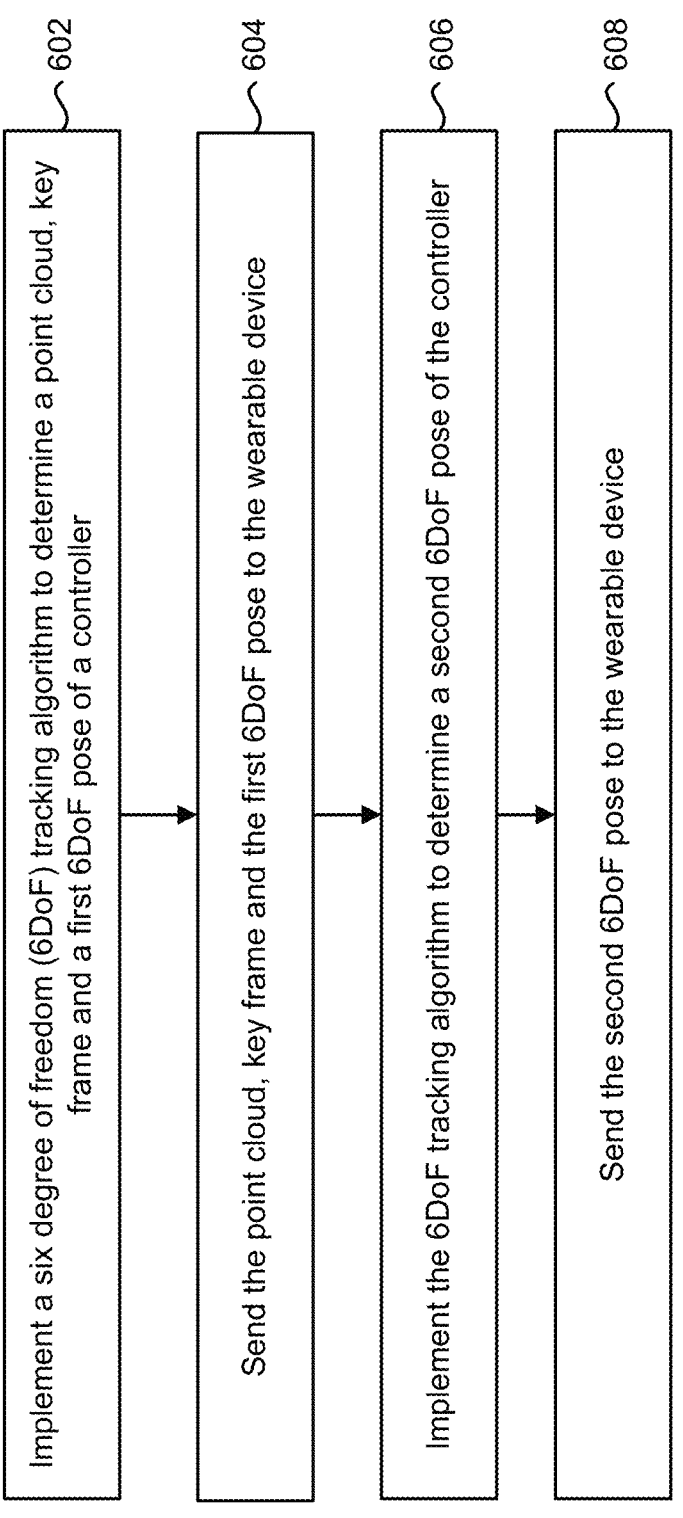
FIG. 6 is a flow diagram illustrating another configuration of a method for tracking a controller as implemented by the controller.

FIG. 6 is a flow diagram illustrating another configuration of a method 600 for tracking a controller 104 as implemented by the controller 104. The controller 104 may be configured to communicate with a wearable device 102. The wearable device 102 and the controller 104 may be implemented in accordance with FIG. 1. The controller 104 may be configured with a camera 106*b* and an IMU 108*b*. The wearable device 102 may include a 6DoF tracking algorithm 110*a*. The controller 104 may also include a 6DoF tracking algorithm 110*b*.

The controller 104 may implement 602 a 6DoF tracking algorithm 110*b* to determine a point cloud 114*b*, key frame 115*b* and a first 6DoF pose 116*b* of the controller 104. For example, the controller 104 may implement 602 the 6DoF tracking algorithm 110*b* as part of an initialization procedure (e.g., when controller 104 boots up). It should be noted that this may be a local implementation 602 of the 6DoF tracking algorithm 110*b*. In other words, the controller 104 may implement 602 the 6DoF tracking algorithm 110*b* independent of the wearable device 102 or other tracking device.

The camera 106*b* may provide image data and the IMU 108*b* may provide inertial data to the 6DoF tracking algorithm 110*b*. The 6DoF tracking algorithm 110*b* may determine a key frame 115*b* from the image data. The 6DoF tracking algorithm 110*b* may also determine the point cloud 114*b* based on the image data and the inertial data. The 6DoF tracking algorithm 110*b* may determine the first 6DoF pose 116*b* of the controller 104 based on the image data, point cloud 114*b* and inertial data. The combination of the point cloud 114*b* and the 6DoF pose 116*b* may provide the position and orientation of the controller 104 in its controller coordinate system 118*b*.

The controller 104 may send 604 the point cloud 114*b*, key frame 115*b* and the initial 6DoF pose 116*b* to the wearable device 102. The wearable device 102 may use the point cloud 114*b*, key frame 115*b* and the initial 6DoF pose 116*b* to facilitate synchronization of a wearable device coordinate system 118*a* with the controller coordinate system 118*b* as described in connection with FIG. 2.

The controller 104 may implement 606 the 6DoF tracking algorithm 110*b* to determine a second 6DoF pose 116*b* of the controller 104. For example, the controller 104 may periodically implement 606 the 6DoF tracking algorithm 110*b* to determine the current (i.e., updated) 6DoF pose 116*b* of the controller 104. During this and subsequent implementations of the 6DoF tracking algorithm 110*b*, the controller 104 may determine only the updated 6DoF pose 116*b*. In other words, the controller 104 need not obtain a point cloud 114*b* during this and subsequent implementations of the 6DoF tracking algorithm 110*b*.

The controller 104 may send 608 the second 6DoF pose 116*b* to the wearable device 102. The wearable device 102 may use the second 6DoF pose 116*b* for rendering content in the application 124.

FIG. 7 is a flow diagram illustrating another configuration of a method 700 for tracking a controller 104 as implemented by a wearable device 102. The wearable device 102 and the controller 104 may be implemented in accordance with FIG. 1. For example, the controller 104 may be configured with a camera 106*b* and an inertial measurement unit (IMU) 108*b*. The wearable device 102 may include a 6DoF tracking algorithm 110*a*. The controller 104 may also include a 6DoF tracking algorithm 110*b*.

The wearable device 102 may implement 702 a 6DoF tracking algorithm 110*a* to determine a point cloud 114*a*, key frame 115*a* and a 6DoF pose 116*a*. For example, the wearable device 102 may implement 702 the 6DoF tracking algorithm 110*a* as part of an initialization procedure (e.g., when wearable device 102 boots up). The point cloud 114*a* and the 6DoF pose 116*a* of the wearable device 102 are in a wearable device coordinate system 118*a*.

The wearable device 102 may receive 704 a point cloud 114*b*, key frame 115*b* and an initial 6DoF pose 116*b* from a controller 104. For example, the controller 104 may also implement a 6DoF tracking algorithm 110*b* to determine its point cloud 114*b*, key frame 115*b* and initial 6DoF pose 116*b*. The point cloud 114*b* and initial 6DoF pose 116*b* received 702 from the controller 104 are in a controller coordinate system 118*b*.

The wearable device 102 may synchronize 706 the wearable device coordinate system 118*a* with the controller coordinate system 118*b* based on the key frame 115*b* and the point cloud 114*b* of the controller 104. This may be accomplished as described in connection with FIG. 1. For example, the wearable device 102 may determine a transformation 123 from the controller coordinate system 118*b* to the wearable device coordinate system 118*a*.

The wearable device 102 may convert 708 the 6DoF pose 116*b* of the controller 104 to the wearable device coordinate system 118*a*. For example, the wearable device 102 may apply the transformation 123 to the received 6DoF pose 116*b* to calculate a converted 6DoF pose 122.

The wearable device 102 may render 710 content in an application 124 using the converted 6DoF pose 122 of the controller 104. For example, the wearable device 102 may use the converted 6DoF pose 122 for rendering an object in the application 124 that corresponds to the position and orientation of controller 104.

The wearable device 102 may receive 712 an updated 6DoF pose 116*b* from the controller 104. For example, the controller 104 may periodically implement the 6DoF tracking algorithm 110*b* to determine the current (i.e., updated) 6DoF pose 116*b* of the controller 104. The controller 104 may then send the updated 6DoF pose 116*b* to the wearable device 102. The wearable device 102 may convert 708 the updated 6DoF pose 116*b* to the wearable device coordinate system 118*a* and may use the updated 6DoF pose 116*b* for rendering 710 content in the application 124.

FIG. 8 is a flow diagram illustrating a configuration of a method 800 for synchronizing the coordinate system 118*a* of a wearable device 102 with the coordinate system 118*b* of the controller 104. The wearable device 102 and the controller 104 may be implemented in accordance with FIG. 1. For example, the controller 104 may be configured with a camera 106*b* and an inertial measurement unit (IMU) 108*b*.

The wearable device 102 may include a 6DoF tracking algorithm 110*a*. The controller 104 may also include a 6DoF tracking algorithm 110*b*.

The wearable device 102 may determine 802 overlapping feature points between a key frame 115*b* of the controller 104 and a key frame 115*a* captured by the wearable device 102. The controller 104 may send the key frame 115*b* to the wearable device 102. In an implementation, an image matching algorithm may determine overlapping feature points between the wearable device key frame 115*a* and controller key frame 115*b*.

The wearable device 102 may determine 804 three-dimensional (3D) points in the point cloud 114*b* of the controller 104 that correspond to 3D points in a point cloud 114*a* of the wearable device 102 based on the overlapping feature points. Once the overlapping feature points are determined 802, their corresponding 3D points may be extracted from the wearable device point cloud 114*a* as well as the controller point cloud 114*b*. For the same real-world points (i.e., feature points), 3D information (e.g., x, y and z coordinates) of those points may be obtained from wearable device 102 and controller 104.

The wearable device 102 may determine 806 a transformation 123 based on the corresponding 3D points of the point cloud 114*b* of the controller 104 and the point cloud 114*a* of the wearable device 102. For example, a transformation matrix may be found using the 3D point correspondence. If the transformation matrix is represented with a 3×4 matrix, at least 4 overlapping feature points are required.

The wearable device 102 may apply 808 the transformation 123 to a 6DoF pose 116*b* of the controller 104. For example, the wearable device 102 may multiply 6DoF pose 116*b* by the transformation matrix to convert the 6DoF pose 116*b* from the controller coordinate system 118*b* to the wearable device coordinate system 118*a*.

Figure 9:
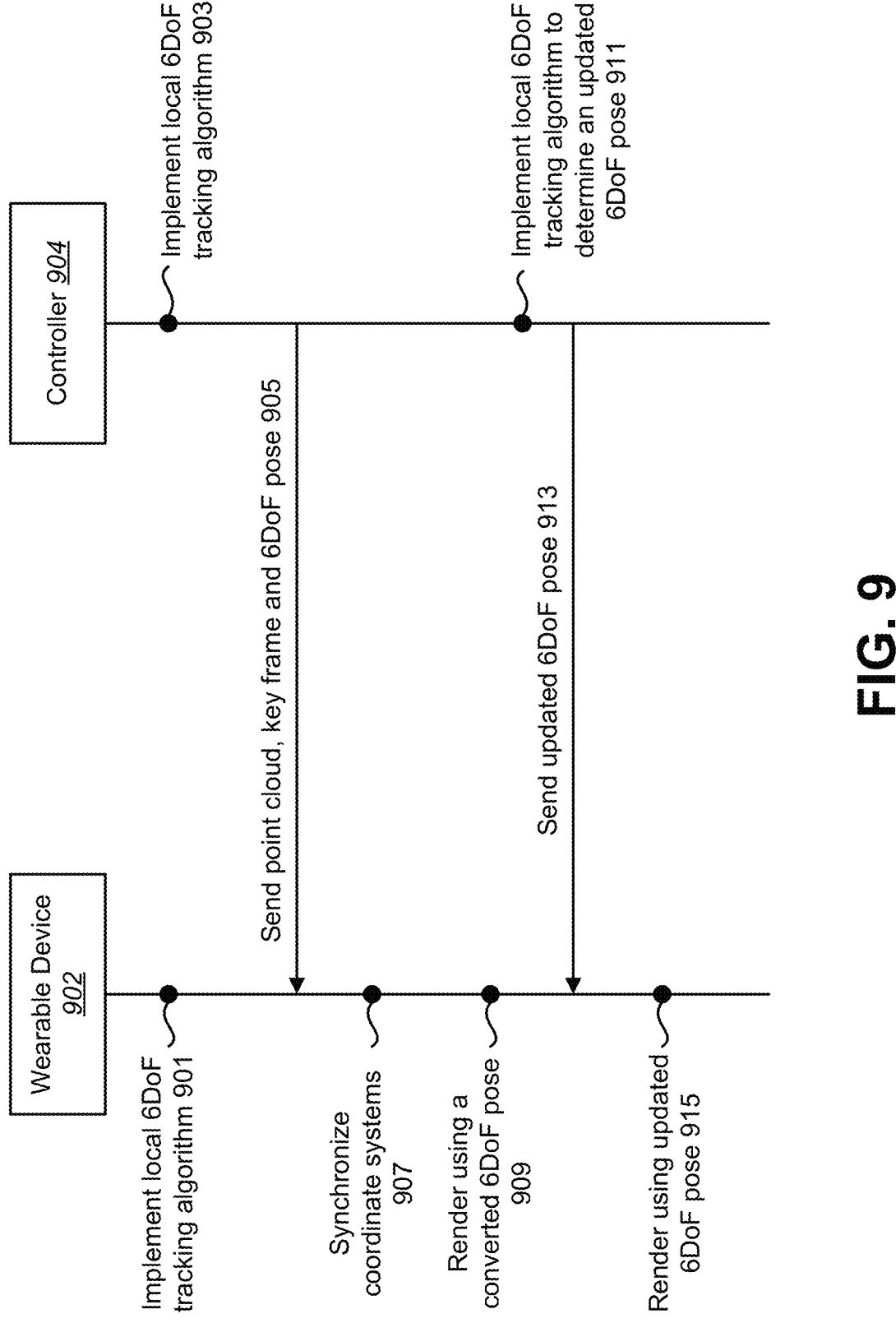
FIG. 9 is a sequence diagram illustrating a procedure for tracking a controller.

FIG. 9 is a sequence diagram illustrating a procedure for tracking a controller 904. A wearable device 902 may communicate with a controller 904. The wearable device 902 may include one or more cameras 106*a* and one or more IMUs 108*a*. The controller 904 may also include one or more cameras 106*b* and one or more IMUs 108.

The wearable device 902 may implement 901 a local 6DoF tracking algorithm 110*a*. For example, the wearable device 902 may implement 901 the 6DoF tracking algorithm 110*a* as part of an initialization procedure (e.g., when wearable device 902 boots up). As part of the 6DoF tracking algorithm 110*a*, the wearable device 902 may determine its point cloud 114*a* and 6DoF pose 116*a*.

The controller 904 may also implement 903 a local 6DoF tracking algorithm 110*b*. For example, the wearable device 902 may implement 901 the 6DoF tracking algorithm 110*b* as part of an initialization procedure (e.g., when wearable device 902 boots up). As part of the 6DoF tracking algorithm 110*b*, the controller 904 may determine its point cloud 114*b* and an initial 6DoF pose 116*b*.

The controller 904 may send 905 its point cloud 114*b*, key frame 115*b* and initial 6DoF pose 116*b* to the wearable device 902. Upon receiving the point cloud 114*b*, key frame 115*b* and initial 6DoF pose 116*b* from the controller 904, the wearable device 902 may synchronize 907 the wearable device coordinate system 118*a* with the controller coordinate system 118*b*. This may be accomplished as described in connection with FIG. 1. For example, the wearable device 902 may determine a transformation 123 from the controller coordinate system 118*b* to the wearable device coordinate system 118*a* based on differences between overlapping regions in the point clouds 114*a-b*.

The wearable device 902 may render 909 content in an application 124 using a converted 6DoF pose 122 of the controller 904. For example, the wearable device 902 may apply the transformation 123 to the initial 6DoF pose 116b of the controller 904. The wearable device 902 may then use the converted 6DoF pose 122 for rendering an object in the application 124 that corresponds to the position of controller 904.

The controller 904 may implement 911 the local 6DoF tracking algorithm 110b to determine an updated 6DoF pose 116b of the controller 904. For example, the controller 904 may periodically implement 911 the 6DoF tracking algorithm 110b to determine the current (i.e., updated) 6DoF pose 116b of the controller 904. The controller 904 may send 913 the updated 6DoF pose 116b to the wearable device 902.

Upon receiving the updated 6DoF pose 116b from the controller 904, the wearable device 902 may render 915 content in the application 124 using the updated 6DoF pose 116b. For example, the wearable device 902 may apply the transformation 123 to the updated 6DoF pose 116b of the controller 904. The wearable device 902 may then use the converted 6DoF pose 122 for rendering an object in the application 124 that corresponds to the updated position of controller 904.

FIG. 10 is a flow diagram illustrating a configuration of a method 1000 for tracking a controller 204 as implemented by a wearable device 202. The wearable device 202 and the controller 204 may be implemented in accordance with FIG. 2. For example, the controller 204 may be configured with a camera 206b and an inertial measurement unit (IMU) 208b. The wearable device 202 may include a 6DoF tracking algorithm 210a.

The wearable device 202 may determine 1002 a key frame 215a and a point cloud 214a of the wearable device 202. For example, a camera 206a of the wearable device 202 may capture image data. The wearable device 202 may select an image as a key frame 215a. The wearable device 202 may determine 1002 the point cloud 214a using image data and IMU data, as described in connection with FIG. 2.

The wearable device 202 may implement 1004 the 6DoF tracking algorithm 210a to determine a 6DoF pose 216a of the wearable device 202. For example, the wearable device 202 may implement 1004 the 6DoF tracking algorithm 210a as part of an initialization procedure (e.g., when wearable device 202 boots up). The point cloud 214a and the 6DoF pose 216a of the wearable device 202 are in a wearable device coordinate system 118a.

The wearable device 202 may receive 1006 a point cloud 214b, key frame 215b and sensor data from the controller 204. For example, the controller 204 may capture a key frame 215b using its camera 206b. The controller 204 may also determine its point cloud 214b based on the image data and IMU data 232. The sensor data received 1006 from the controller 104 may include image data 234 and IMU data 232. In an implementation, the image data 234 and IMU data 232 may be timestamped.

The wearable device 202 may synchronize 1008 the wearable device coordinate system 118a with the controller coordinate system 118b based on the point cloud 214b and the key frame 215b of the controller 204. This may be accomplished as described in connection with FIG. 2. For example, the wearable device 202 may determine a transformation 223 from the controller coordinate system 118b to the wearable device coordinate system 118a based on overlapping feature points in the point cloud 214a of the wearable device 202 and the point cloud 214b of the controller 204.

The wearable device 202 may determine 1010 a first 6DoF pose 216b of the controller 204. For example, the wearable device 202 may determine a three-dimensional orientation of the controller 204 within the point cloud 214b of the controller 204 based on timestamped IMU data 232 and timestamped image data 234 received from the controller 204. The wearable device 202 may apply the transformation 223 to the first 6DoF pose 216b to determine a converted 6DoF pose 222 of the controller 204.

The wearable device 202 may render 1012 content in an application 224 based on the first 6DoF pose 216b of the controller 204. For example, the wearable device 202 may use the converted 6DoF pose 222 for rendering an object in the application 224 that corresponds to the position of the controller 204.

The wearable device 202 may receive 1014 updated sensor data from the controller 204. The controller 204 may periodically send updated sensor data to the wearable device 202. The updated sensor data may include updated IMU data 232 and/or image data 234.

The wearable device 202 may use the updated sensor data to determine 1016 a second controller 6DoF pose 216b. For example, the 6DoF tracking algorithm 210a implemented on the wearable device 202 may determine the second controller 6DoF pose 216b as described in connection with FIG. 2. The wearable device 202 may convert this second 6DoF pose 216b from the controller coordinate system 118b to the wearable device coordinate system 118a. For example, the synchronization module 220 may apply the transformation 223 to the second 6DoF pose 216b.

The wearable device 202 may render 1018 content in the application 224 based on the second 6DoF pose 216b. For example, the wearable device 202 may determine the difference between the first 6DoF pose 216b and the second 6DoF pose 216b. This difference may indicate the position and motion of the controller 204 relative to the 6DoF pose 216a of the wearable device 202. Using this difference, the wearable device 202 may update rendering 1018 the content of the application 224.

Figure 11:
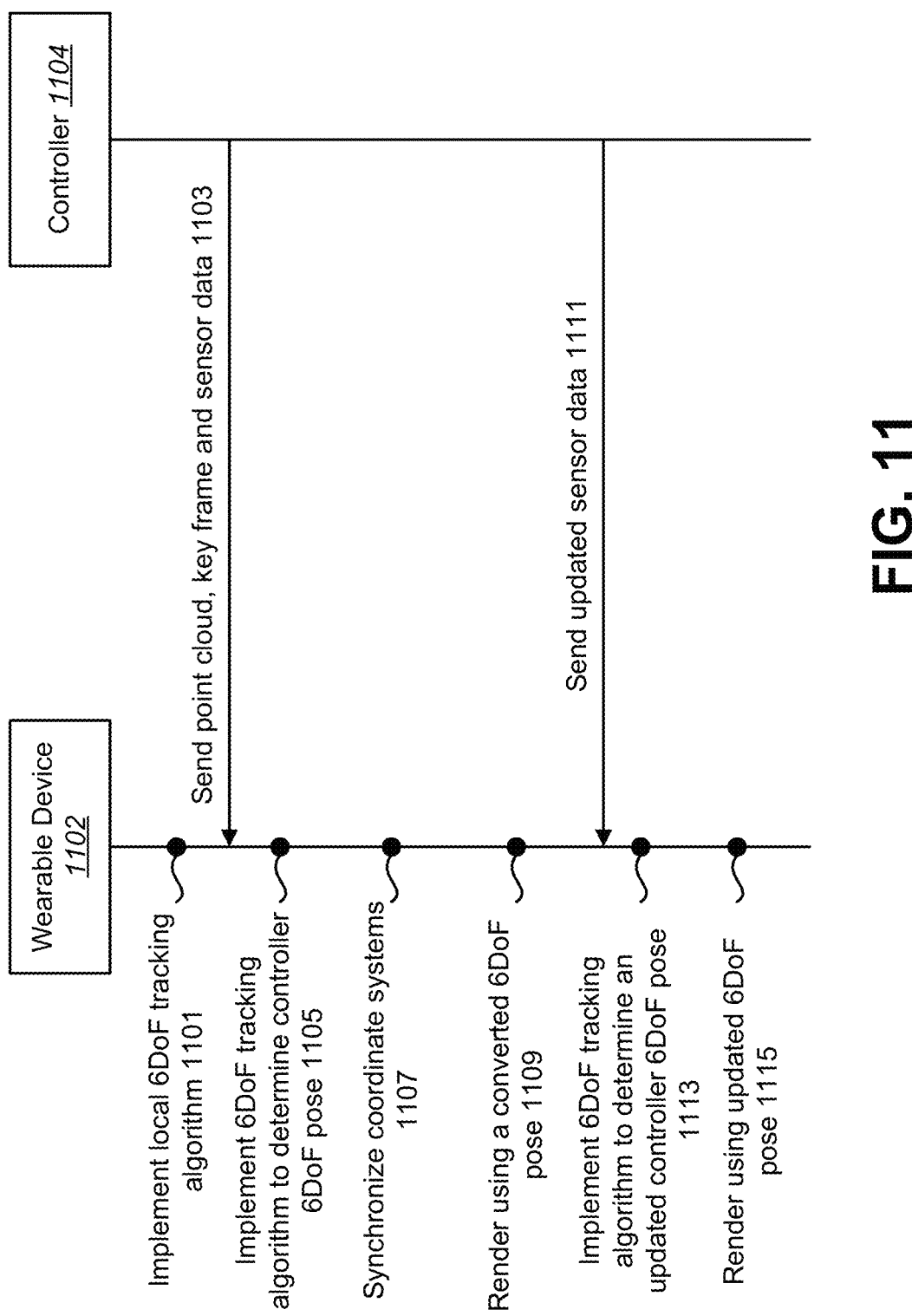
FIG. 11 is a sequence diagram illustrating another procedure for tracking a controller.

FIG. 11 is a sequence diagram illustrating another procedure for tracking a controller 1104. A wearable device 1102 may communicate with a controller 1104. The wearable device 1102 and the controller 1104 may be implemented in accordance with FIG. 2. For example, the wearable device 1102 may include one or more cameras 206a and one or more IMUs 208a. The controller 1104 may also include one or more cameras 206b and one or more IMUs 208.

The wearable device 1102 may implement 1101 a local 6DoF tracking algorithm 210a. For example, the wearable device 1102 may implement 1101 the 6DoF tracking algorithm 210a as part of an initialization procedure (e.g., when wearable device 1102 boots up). As part of the 6DoF tracking algorithm 210a, the wearable device 1102 may determine its point cloud 214a, key frame 215a and 6DoF pose 216a.

The controller 1104 may send 1103 its point cloud 214b, key frame 215b and sensor data to the wearable device 1102. For example, the controller 1104 may capture a key frame 215b using its camera 206b. The controller 1104 may also determine its point cloud 214b based on the image data 234 and IMU data 232. The sensor data sent 1103 to the wearable device 1102 may include timestamped IMU data 232 and timestamped image data 234 captured by the camera 206b.

Upon receiving the point cloud 214b, key frame 215b and sensor data from the controller 1104, the wearable device 1102 may implement 1105 the 6DoF tracking algorithm 210a to determine a 6DoF pose 216b of the controller 1104.

For example, the wearable device 1102 may determine a three-dimensional orientation of the controller 1104 within the point cloud 214*b* of the controller 1104 based on the IMU data 232 received from the controller 1104.

The wearable device 1102 may synchronize 1107 the wearable device coordinate system 218*a* with the controller coordinate system 218*b*. This may be accomplished as described in connection with FIG. 2. For example, the wearable device 1102 may determine a transformation 223 from the controller coordinate system 218*b* to the wearable device coordinate system 218*a* based on differences between overlapping regions in the point clouds 214*a-b*.

The wearable device 1102 may render 1109 content in an application 224 using a converted 6DoF pose 222 of the controller 1104. For example, the wearable device 1102 may apply the transformation 223 to the initial 6DoF pose 216*b* of the controller 1104. The wearable device 1102 may then use the converted 6DoF pose 222 for rendering an object in the application 224 that corresponds to the position of controller 1104.

The controller 1104 may send 1111 updated sensor data. For example, the controller 1104 may periodically send 1111 updated IMU data 232 and/or image data 234 to the wearable device 1102.

Upon receiving the updated sensor data, the wearable device 1102 may implement 1113 the 6DoF tracking algorithm 210*a* to determine an updated 6DoF pose 216*b* of the controller 1104. For example, the wearable device 1102 may determine a three-dimensional orientation of the controller 1104 within the point cloud 214*b* of the controller 1104 based on the updated IMU data 232 received from the controller 1104.

The wearable device 1102 may render 1115 content in the application 224 using the updated 6DoF pose 216*b*. For example, the wearable device 1102 may apply the transformation 223 to the updated 6DoF pose 216*b* of the controller 1104. The wearable device 1102 may then use the converted 6DoF pose 222 for rendering an object in the application 224 that corresponds to the updated position of controller 1104.

Figure 12:
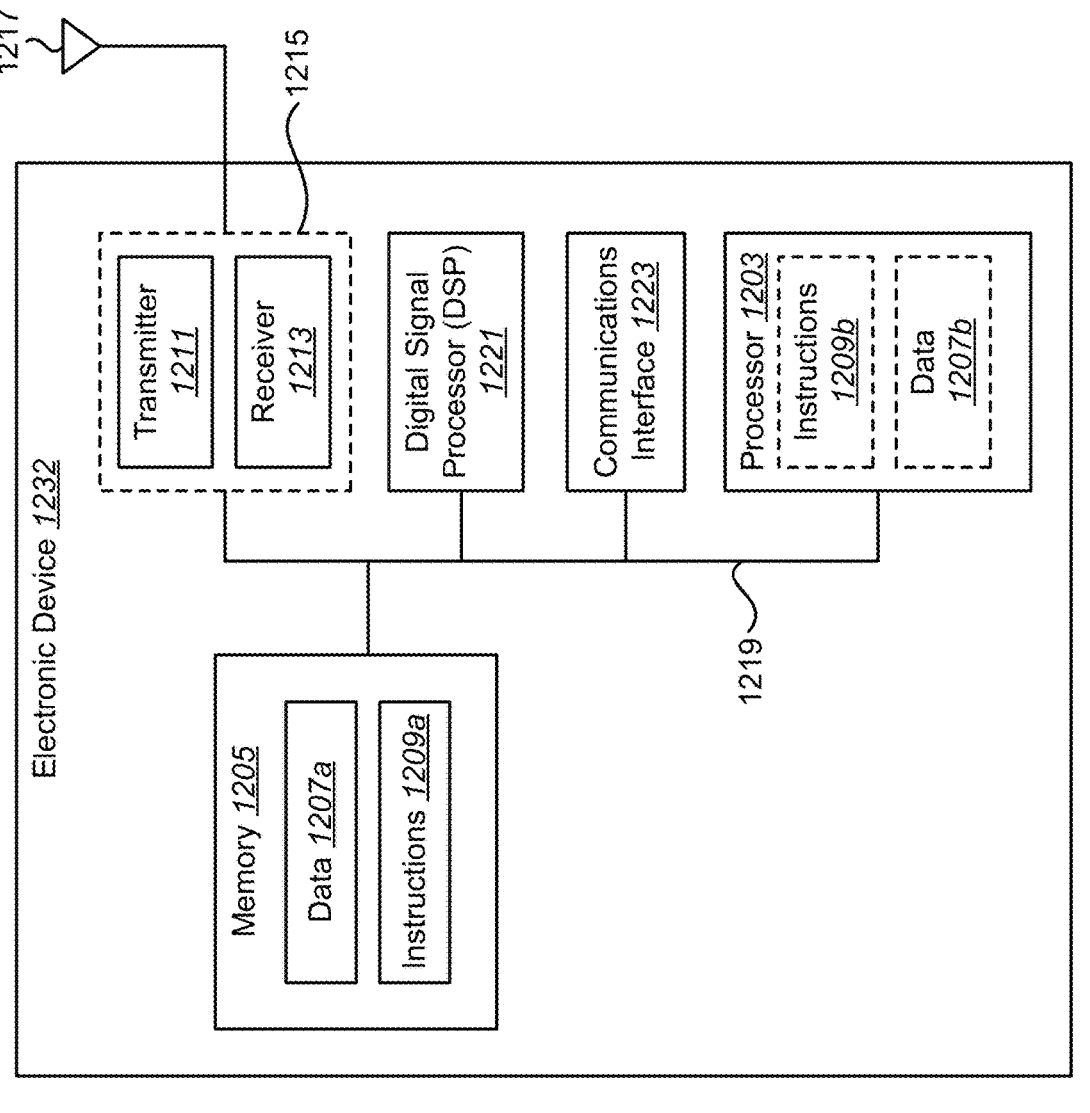
FIG. 12 illustrates certain components that may be included within an electronic device.

FIG. 12 illustrates certain components that may be included within an electronic device 1232. The electronic device 1232 described in connection with FIG. 12 may be an example of and/or may be implemented in accordance with the wearable device 102 or controller 104 described in connection with FIG. 1 or the wearable device 202 or controller 204 described in connection with FIG. 2.

The electronic device 1232 includes a processor 1203. The processor 1203 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1203 may be referred to as a central processing unit (CPU). Although just a single processor 1203 is shown in the electronic device 1232 of FIG. 12, in an alternative configuration, a combination of processors (e.g., an ARM and DSP) could be used.

The electronic device 1232 also includes memory 1205 in electronic communication with the processor 1203 (i.e., the processor can read information from and/or write information to the memory). The memory 1205 may be any electronic component capable of storing electronic information. The memory 1205 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 1207*a* and instructions 1209*a* may be stored in the memory 1205. The instructions 1209*a* may include one or more programs, routines, sub-routines, functions, procedures, code, etc. The instructions 1209*a* may include a single computer-readable statement or many computer-readable statements. The instructions 1209*a* may be executable by the processor 1203 to implement the methods disclosed herein. Executing the instructions 1209*a* may involve the use of the data 1207*a* that is stored in the memory 1205. When the processor 1203 executes the instructions 1209, various portions of the instructions 1209*b* may be loaded onto the processor 1203, and various pieces of data 1207*b* may be loaded onto the processor 1203.

The electronic device 1232 may also include a transmitter 1211 and a receiver 1213 to allow transmission and reception of signals to and from the electronic device 1232 via an antenna 1217. The transmitter 1211 and receiver 1213 may be collectively referred to as a transceiver 1215. The electronic device 1232 may also include (not shown) multiple transmitters, multiple antennas, multiple receivers and/or multiple transceivers.

The electronic device 1232 may include a digital signal processor (DSP) 1221. The electronic device 1232 may also include a communications interface 1223. The communications interface 1223 may allow a user to interact with the electronic device 1232.

The various components of the electronic device 1232 may be coupled together by one or more buses, which may include a power bus, a control signal bus, a status signal bus, a data bus, etc. For the sake of clarity, the various buses are illustrated in FIG. 12 as a bus system 1219.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
obtaining first geometric information from a controller, the first geometric information including a first point cloud of the controller associated with a scene;
obtaining second geometric information based on image data from a camera of a wearable device, the second geometric information including a second point cloud of the wearable device associated with the scene;
determining a correspondence between the first point cloud and the second point cloud based on three-dimensional (3D) points in the first point cloud that correspond to 3D points in the second point cloud;
outputting, based on the correspondence, a third point cloud including points from the first point cloud and points from the second point cloud; and
determining a six degree of freedom (6DoF) pose of the controller or the wearable device based on the third point cloud.

2. The method of claim 1, wherein the third point cloud includes at least one point from the first point cloud that is not included in the second point cloud and at least one point from the second point cloud that is not included in the first point cloud.

3. The method of claim 1, further comprising storing the third point cloud.

4. The method of claim 1, wherein determining the 6DoF pose comprises determining a 6DoF pose of the controller based on the third point cloud.

5. The method of claim 4, further comprising:
receiving, from the controller, at least one of image data or inertial measurement unit (IMU) data; and
determining the 6DoF pose of the controller based on at least of the image data or the IMU data.

6. The method of claim 5, wherein determining the 6DoF pose of the controller comprises:
determining a three-dimensional orientation of the controller within the first point cloud of the controller based on at least one of timestamped IMU data or timestamped image data received from the controller.

7. The method of claim 4, further comprising:
determine, based on the correspondence, a transformation from a coordinate system of the controller to a coordinate system of the wearable device;
converting, using the transformation, the 6DoF pose of the controller to the coordinate system of the wearable device; and
rendering content in an application based on the converted 6DoF pose.

8. The method of claim 7, further comprising:
receiving, from the controller, a second 6DoF pose of the controller determined by a 6DoF tracking algorithm implemented on the controller; and
rendering content in the application based on the second 6DoF pose.

9. The method of claim 7, further comprising:
receiving, from the controller, updated geometric information and updated IMU data from which a 6DoF tracking algorithm implemented on the wearable device determines a second 6DoF pose of the controller; and
rendering content in the application based on the second 6DoF pose.

10. The method of claim 7, further comprising:
receiving a point cloud update from the controller; and
synchronizing the coordinate system of the wearable device with the coordinate system of the controller based on the point cloud update.

11. The method of claim 1, wherein determining the 6DoF pose comprises determining a 6DoF pose of the wearable device based on the third point cloud.

12. The method of claim 11, further comprising:
rendering content based on the 6DoF pose of the wearable device.

13. The method of claim 1, further comprising:
receiving a point cloud update from the controller; and
determining an updated 6DoF pose of the wearable device based on the point cloud update.

14. The method of claim 1, further comprising implementing a 6DoF tracking algorithm on the wearable device to determine a 6DoF pose of the wearable device based on the third point cloud.

15. The method of claim 1, further comprising determining the second point cloud of the wearable device based on image data received from the wearable device.

16. An apparatus, comprising:

a memory; and a processor in communication with the memory, the processor configured to:

obtain first geometric information from a controller, the first geometric information including a first point cloud of the controller associated with a scene;

obtain second geometric information based on image data from a camera of a wearable device, the second geometric information including a second point cloud of the wearable device associated with the scene;

determine a correspondence between the first point cloud and the second point cloud based on three-dimensional (3D) points in the first point cloud that correspond to 3D points in the second point cloud;

output, based on the correspondence, a third point cloud including points from the first point cloud and points from the second point cloud; and determine a six degree of freedom (6DoF) pose of the controller or the wearable device based on the third point cloud.

17. The apparatus of claim 16, wherein the third point cloud includes at least one point from the first point cloud that is not included in the second point cloud and at least one point from the second point cloud that is not included in the first point cloud.

18. The apparatus of claim 16, further comprising storing the third point cloud.

19. The apparatus of claim 16, wherein determining the 6DoF pose comprises determining a 6DoF pose of the controller based on the third point cloud.

20. The apparatus of claim 19, further comprising:

receiving, from the controller, at least one of image data or inertial measurement unit (IMU) data; and determining the 6DoF pose of the controller based on at least of the image data or the IMU data.

21. The apparatus of claim 20, wherein determining the 6DoF pose of the controller comprises:

determining a three-dimensional orientation of the controller within the first point cloud of the controller based on at least one of timestamped IMU data or timestamped image data received from the controller.

22. The apparatus of claim 19, further comprising:

determine, based on the correspondence, a transformation from a coordinate system of the controller to a coordinate system of the wearable device;

converting, using the transformation, the 6DoF pose of the controller to the coordinate system of the wearable device; and rendering content in an application based on the converted 6DoF pose.

23. The apparatus of claim 22, further comprising:

receiving, from the controller, a second 6DoF pose of the controller determined by a 6DoF tracking algorithm implemented on the controller; and rendering content in the application based on the second 6DoF pose.

24. The apparatus of claim 22, further comprising:

receiving, from the controller, updated geometric information and updated IMU data from which a 6DoF tracking algorithm implemented on the wearable device determines a second 6DoF pose of the controller; and rendering content in the application based on the second 6DoF pose.

25. The apparatus of claim 22, further comprising:

receiving a point cloud update from the controller; and synchronizing the coordinate system of the wearable device with the coordinate system of the controller based on the point cloud update.

26. The apparatus of claim 16, wherein determining the 6DoF pose comprises determining a 6DoF pose of the wearable device based on the third point cloud.

27. The apparatus of claim 26, further comprising:

rendering content based on the 6DoF pose of the wearable device.

28. The apparatus of claim 16, further comprising:

receiving a point cloud update from the controller; and determining an updated 6DoF pose of the wearable device based on the point cloud update.

29. The apparatus of claim 16, further comprising implementing a 6DoF tracking algorithm on the wearable device to determine a 6DoF pose of the wearable device based on the third point cloud.

30. The apparatus of claim 16, further comprising determining the second point cloud of the wearable device based on image data received from the wearable device.

* * * * *